(12) United States Patent
Yang et al.

(10) Patent No.: US 8,891,348 B2
(45) Date of Patent: Nov. 18, 2014

(54) METHOD AND APPARATUS FOR TRANSMITTING CONTROL INFORMATION

(75) Inventors: Suckchel Yang, Anyang-si (KR);
Mingyu Kim, Anyang-si (KR);
Seunghee Han, Anyang-si (KR);
Hyunwoo Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 82 days.

(21) Appl. No.: 13/823,687

(22) PCT Filed: Sep. 15, 2011

(86) PCT No.: PCT/KR2011/006794
§ 371 (c)(1),
(2), (4) Date: Mar. 14, 2013

(87) PCT Pub. No.: WO2012/036473
PCT Pub. Date: Mar. 22, 2012

(65) Prior Publication Data
US 2013/0176929 A1    Jul. 11, 2013

Related U.S. Application Data

(60) Provisional application No. 61/382,930, filed on Sep. 15, 2010, provisional application No. 61/383,735, filed on Sep. 17, 2010, provisional application No. 61/391,964, filed on Oct. 11, 2010.

(51) Int. Cl.
| | |
|---|---|
| *G08C 25/02* | (2006.01) |
| *H04L 1/18* | (2006.01) |
| *H04L 5/00* | (2006.01) |
| *H04L 27/26* | (2006.01) |
| *H04W 72/04* | (2009.01) |
| *H04B 7/06* | (2006.01) |

(52) U.S. Cl.
CPC ......... *H04W 72/0413* (2013.01); *H04L 1/1861* (2013.01); *H04L 5/0035* (2013.01); *H04B 7/0689* (2013.01); *H04L 5/0073* (2013.01); *H04L 27/2628* (2013.01); *H04L 5/0055* (2013.01); *H04L 5/0007* (2013.01)
USPC ........................... 370/203; 370/329; 714/748

(58) Field of Classification Search
None
See application file for complete search history.

(56) References Cited

U.S. PATENT DOCUMENTS

| 8,514,883 B2 * | 8/2013 | Pan et al. ...................... 370/468 |
| 8,526,387 B2 * | 9/2013 | Yang et al. ..................... 370/329 |
| 2010/0210256 A1 * | 8/2010 | Shen et al. ................. 455/422.1 |

OTHER PUBLICATIONS

PCT International Application No. PCT/KR2011/006794, Written Opinion of the International Searching Authority dated Feb. 27, 2012, 16 pages.
Texas Instruments, "Resource Allocation for A/N Transmission on PUCCH", R1-104466, 3GPP TSG RAN WG1 #62, Aug. 2010, 4 pages.
Pantech, "UL PUCCH A/N resource allocation for CA", R1-104632, 3GPP TSG RAN1 #62, Aug. 2010, 4 pages.

(Continued)

Primary Examiner — Alex Skripnikov
(74) Attorney, Agent, or Firm — Lee, Hong, Degerman, Kang & Waimey

(57) ABSTRACT

The present invention relates to a wireless communication system. More particularly, the present invention relates to a method and apparatus for transmitting uplink control information. The method for transmitting uplink control information comprises: a step of selecting one uplink control channel resource corresponding to a plurality of HARQ-ACKs from among a plurality of uplink control channel resources, and a step of transmitting complex values corresponding to the plurality of HARQ-ACKs using the selected uplink control channel resource.

12 Claims, 25 Drawing Sheets

(56) References Cited

OTHER PUBLICATIONS

LG Electronics, "Further details of ACK/NACK selection method", R1-104641, 3GPP TSG RAN WG1 #62, Aug. 2010, 8 pages.

Fujitsu, "Channel Selection for A/N feedback in CA", R1-104875, 3GPP TSG-RAN1 #62, Aug. 2010, 6 pages.

PCT International Application No. PCT/KR2011/006794, Written Opinion of the International Searching Authority dated Feb. 27, 2012, 9 pages.

* cited by examiner

FIG. 12

|  | PUCCH #1 | PUCCH #2 | PUCCH #3 |
|---|---|---|---|
|  | (01) (11)<br>(00) (10) | (01) (11)<br>(00) (10) | (01) (11)<br>(00) (10) |
| Opt 1 | NNN (0)<br>ANN (4) | NAN (2)<br>AAN (6)<br>AAA (7) | NAA (3)<br>NNA (1)<br>ANA (5) |
| Opt 2 | NNN (0)<br>ANN (4) | NAA (3)<br>NAN (2)<br>AAN (6) | NNA (1)<br>ANA (5)<br>AAA (7) |
| Opt 3 | NNN (0)<br>ANN (4) | NAN (2)<br>AAN (6) | NNA (1)<br>NAA (3)<br>AAA (7)<br>ANA (5) |
| Opt 4 | NNN (0)<br>ANN (4) | NAN (2)<br>AAN (6)<br>AAA (7)<br>AAN (6) | NNA (3)<br>ANA (5) |

FIG. 15

|  | PCC PUCCH #1 | PCC PUCCH #2 | SCC PUCCH #1 | SCC PUCCH #2 |
|---|---|---|---|---|
| Opt 1 | NNNN(0) / NANN(4) / ANNN(8) / AANN(12) | NANA(5) / NAAA(7) / AAAA(15) / AANA(13) | NNNA(1) / NNAA(3) / ANAA(11) / ANNA(9) | NNAN(2) / NAAN(6) / AAAN(14) / ANAN(10) |
| Opt 2 | NNNN(0) / NANN(4) / ANNN(8) / AANN(12) | NAAN(6) / NAAA(7) / AAAA(15) / AAAN(14) | NNAN(2) / NNAA(3) / ANAA(11) / ANAN(10) | NNNA(1) / NANA(5) / AANA(13) / ANNA(9) |
| Opt 3 | NNNN(0) / NANN(4) / ANNN(8) / AANN(12) | ANNA(9) / ANAA(11) / AAAA(15) / AANA(13) | NNNA(1) / NNAA(3) / NAAA(7) / NANA(5) | NNAN(2) / NAAN(6) / AAAN(14) / ANAN(10) |
| Opt 4 | NNNN(0) / NANN(4) / ANNN(8) / AANN(12) | ANAN(10) / ANAA(11) / AAAA(15) / AAAN(14) | NNAN(2) / NNAA(3) / NAAA(7) / NAAN(6) | NNNA(1) / NANA(5) / AANA(13) / ANNA(9) |

FIG. 16
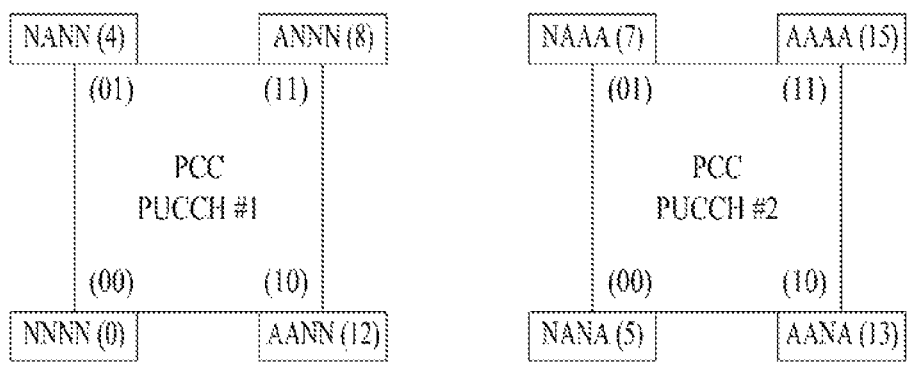
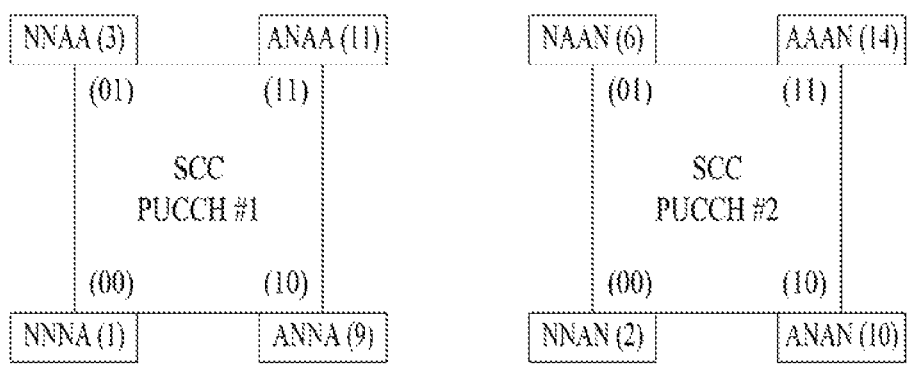

FIG. 19

FIG. 20
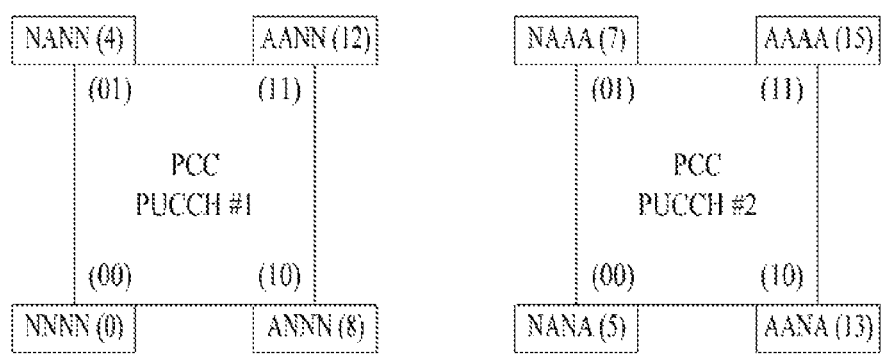
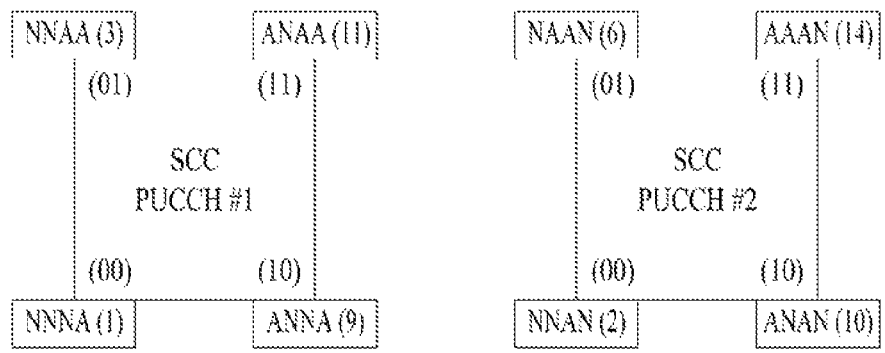

METHOD AND APPARATUS FOR TRANSMITTING CONTROL INFORMATION

CROSS-REFERENCE TO RELATED APPLICATIONS

This application is the National Stage filing under 35 U.S.C. 371 of International Application No. PCT/KR2011/006794, filed on Sep. 15, 2011, which claims the benefit of U.S. Provisional Application Ser. No. 61/382,930, filed on Sep. 15, 2010, U.S. Provisional Application Ser. No. 61/383,735, filed on Sep. 17, 2010, and U.S. Provisional Application Ser. No. 61/391,964, filed on Oct. 11, 2010, the contents of which are all hereby incorporated by reference herein in their entirety.

TECHNICAL FIELD

The present invention relates to a wireless communication system, and more particularly, to a method and apparatus for transmitting control information.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA).

DISCLOSURE

Technical Problem

An object of the present invention devised to solve the problem lies in a method of efficiently transmitting uplink control information and an apparatus therefor in a wireless communication system. Another object of the present invention is to provide a method of efficiently transmitting control information, preferably, ACK/NACK information in a multi-carrier situation and an apparatus therefor.

It will be appreciated by persons skilled in the art that the objects that could be achieved with the present invention are not limited to what has been particularly described hereinabove and the above and other objects that the present invention can achieve will be more clearly understood from the following detailed description taken in conjunction with the accompanying drawings.

Technical Solution

The object of the present invention can be achieved by providing a method for transmitting uplink control information when a plurality of cells including a primary cell and a secondary cell is configured in a wireless communication system, the method including: selecting a PUCCH (Physical Uplink Control Channel) resource corresponding to a plurality of HARQ ACKs (Hybrid Automatic Repeat request-Acknowledgements) from a plurality of PUCCH resources for PUCCH format 1b; and transmitting a complex value corresponding to the plurality of HARQ-ACKs using the selected PUCCH resource, wherein the plurality of HARQ-ACKs, PUCCH resources and bit values have the relationship represented by the following table,

| HARQ-ACK(0), HARQ-ACK(1), HARQ-ACK(2) | PUCCH resource #1 | PUCCH resource #2 | PUCCH resource #3 |
|---|---|---|---|
| N, N, N | +1 | 0 | 0 |
| N, N, A | 0 | 0 | −1 |
| N, A, N | +j | 0 | 0 |
| N, A, A | 0 | −1 | 0 |
| A, N, N | −j | 0 | 0 |
| A, N, A | 0 | +1 | 0 |
| A, A, N | −1 | 0 | 0 |
| A, A, A | 0 | +j | 0 |
| D, D, N | 0 | 0 | +1 | wherein HARQ-ACKs(0) and (1) indicate ACK(A)/NACK(N)/DTX(D) responses to data block(s) on a MIMO (Multiple Input Multiple Output) cell, HARQ-ACK(2) indicates an ACK(A)/NACK(N)/DTX(D) response to a data block on a non-MIMO cell, PUCCH resources #1 and #2 represent PUCCH resources linked to the MIMO cell for PUCCH format 1b, and PUCCH resource #3 represents a PUCCH resource linked to the non-MIMO cell for PUCCH format 1b.

In another aspect of the present invention, provided herein is a communication apparatus configured to transmit uplink control information when a plurality of cells including a primary cell and a secondary cell is configured in a wireless communication system, the communication apparatus including an RF unit, and a processor, wherein the processor is configured to select a PUCCH resource corresponding to a plurality of HARQ ACKs from a plurality of PUCCH resources for PUCCH format 1b and to transmit a complex value corresponding to the plurality of HARQ-ACKs using the selected PUCCH resource, wherein the plurality of HARQ-ACKs, PUCCH resources and bit values have the relationship represented by the following table,

| HARQ-ACK(0), HARQ-ACK(1), HARQ-ACK(2) | PUCCH resource #1 | PUCCH resource #2 | PUCCH resource #3 |
|---|---|---|---|
| N, N, N | +1 | 0 | 0 |
| N, N, A | 0 | 0 | −1 |
| N, A, N | +j | 0 | 0 |
| N, A, A | 0 | −1 | 0 |
| A, N, N | −j | 0 | 0 |
| A, N, A | 0 | +1 | 0 |
| A, A, N | −1 | 0 | 0 |
| A, A, A | 0 | +j | 0 |
| D, D, N | 0 | 0 | +1 | wherein HARQ-ACKs(0) and (1) indicate ACK(A)/NACK(N)/DTX(D) responses to data block(s) on a MIMO (Multiple Input Multiple Output) cell, HARQ-ACK(2) indicates an ACK(A)/NACK(N)/DTX(D) response to a data block on a non-MIMO cell, PUCCH resources #1 and #2 represent PUCCH resources linked to the MIMO cell for PUCCH format 1b, and PUCCH resource #3 represents a PUCCH resource linked to the non-MIMO cell for PUCCH format 1b.

When the primary cell and the secondary cell are respectively configured as the MIMO cell and the non-MIMO cell, HARQ-ACKs(0) and (1) may denote ACK/NACK/DTX responses to a PDSCH (Physical Downlink Control Channel) on the primary cell and HARQ-ACK(2) may denote an ACK/NACK/DTX response to a PDSCH on the secondary cell. In this case, the PUCCH resource #1 may represent a PUCCH resource linked to a first CCE (Control Channel Element) constituting a PDCCH (Physical Downlink Control Channel) corresponding to the PDSCH on the primary cell, and PUCCH resource #2 may represent a PUCCH resource linked to a second CCE constituting the PDCCH corresponding to the PDSCH on the primary cell.

When the primary cell and the secondary cell are respectively configured as the non-MIMO cell and the MIMO cell, HARQ-ACKs(0) and (1) may denote ACK/NACK/DTX responses to a PDSCH on the secondary cell and HARQ-ACK(2) may denote an ACK/NACK/DTX response to a PDSCH on the primary cell. In this case, the PUCCH resource #3 may represent a PUCCH resource linked to a first CCE constituting a PDCCH corresponding to the PDSCH on the primary cell.

The primary cell may include a PCC (Primary Component Carrier) and the secondary cell may include an SCC (Secondary Component Carrier).

Advantageous Effects

According to the present invention, uplink control information can be efficiently transmitted in a wireless communication system. Furthermore, control information, preferably, ACK/NACK information can be efficiently transmitted in a multicarrier situation.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIGS. 11 to 29 illustrate ACK/NACK mapping schemes according to embodiments of the present invention.

BEST MODE

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, Evolved UTRA (E-UTRA). UTRA is a part of Universal Mobile Telecommunications System (UMTS). $3^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is an evolution of 3GPP LTE.

While the following description is given, centering on 3GPP LTE/LTE-A to clarify the description, this is purely exemplary and thus should not be construed as limiting the present invention.

Figure 1:
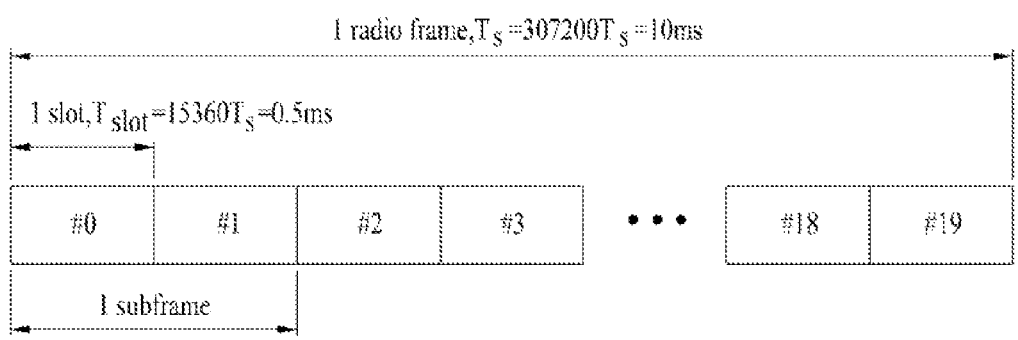
FIG. 1 illustrates a radio frame structure.

FIG. 1 illustrates a radio frame structure.

Referring to FIG. 1, a radio frame includes 10 subframes. A subframe includes two slots in time domain. A time for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) or single carrier frequency division multiple access (SC-FDMA) symbols in time domain. Since LTE uses the OFDMA in the downlink and uses SC-FDMA in the uplink, an OFDM or SC-FDMA symbol represents one symbol period. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

Figure 2:
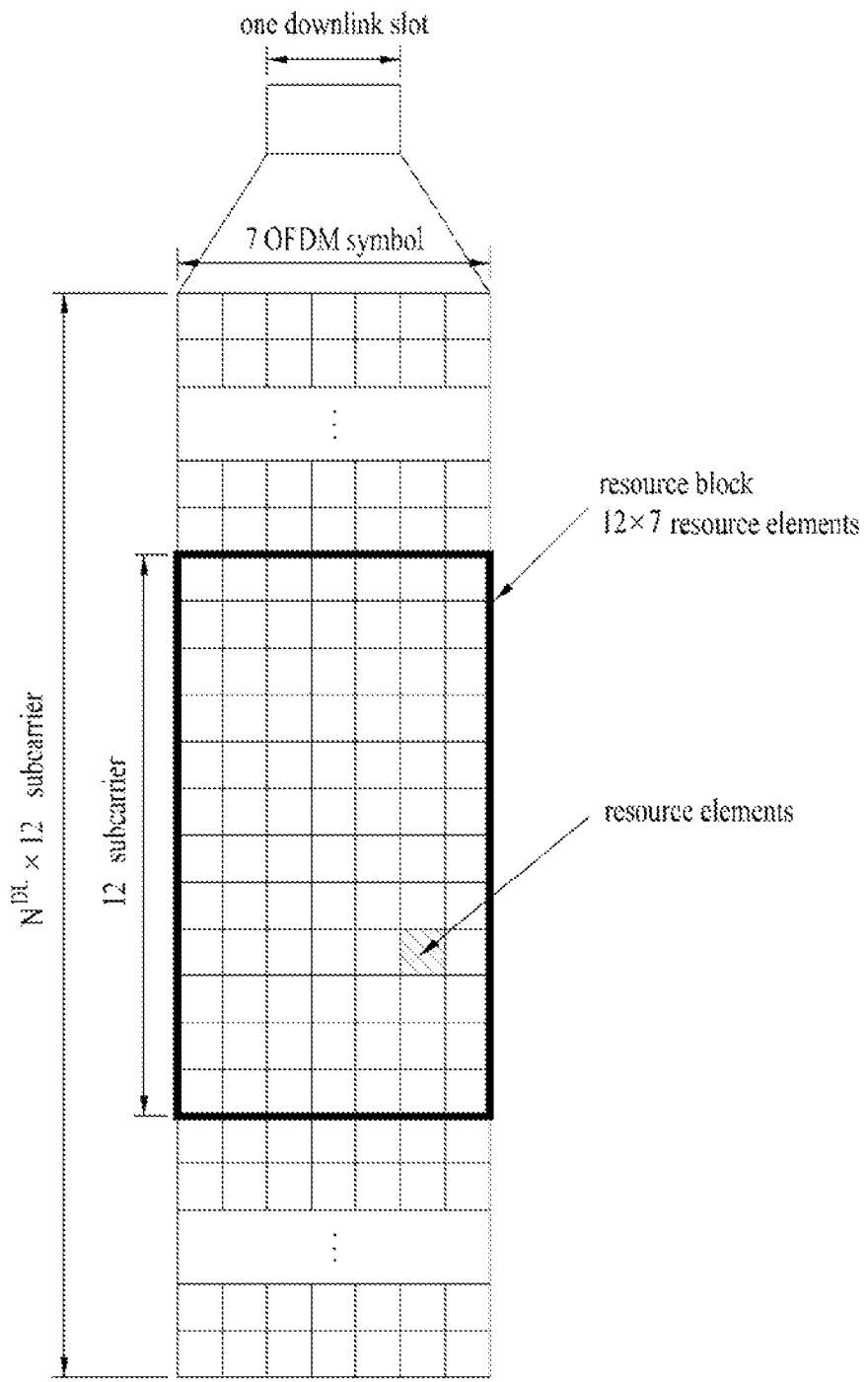
FIG. 2 illustrates a resource grid of a downlink slot.

FIG. 2 illustrates a resource grid of a downlink slot.

Referring to FIG. 2, a downlink slot includes a plurality of OFDM symbols in the time domain. One downlink slot may include 7(6) OFDM symbols, and one resource block (RB) may include 12 subcarriers in the frequency domain. Each element on the resource grid is referred to as a resource element (RE). One RB includes 12×7(6) REs. The number $N_{RB}$ of RBs included in the downlink slot depends on a downlink transmit bandwidth. The structure of an uplink slot may be same as that of the downlink slot except that OFDM symbols by replaced by SC-FDMA symbols.

Figure 3:
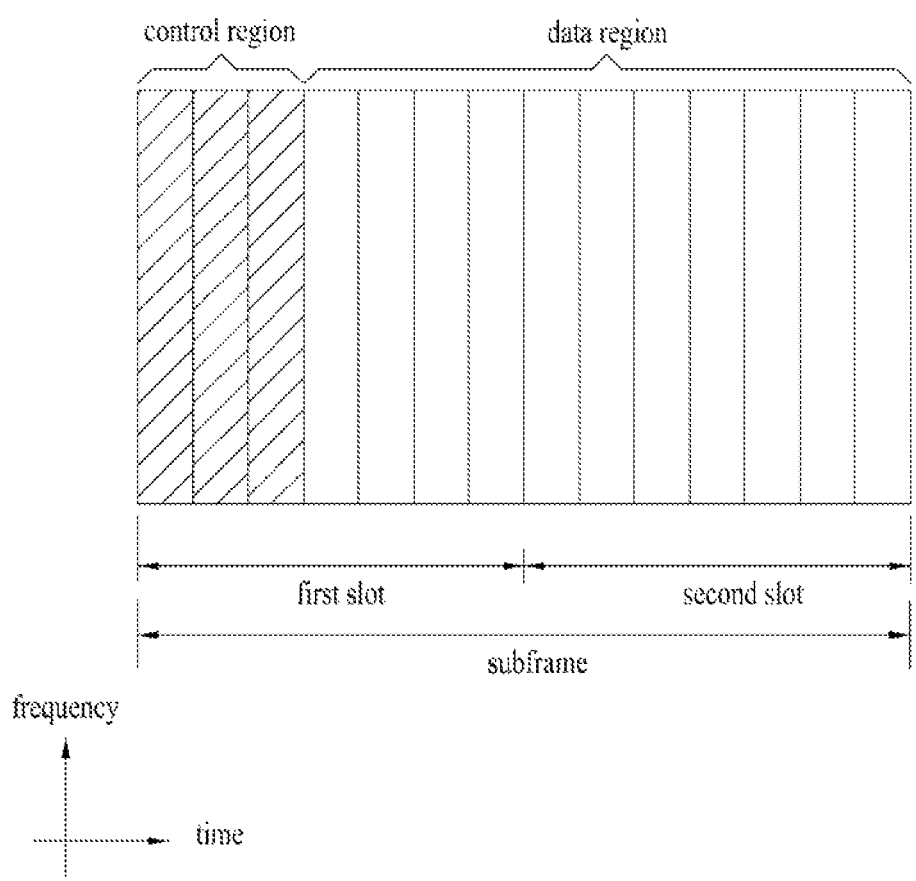
FIG. 3 illustrates a downlink subframe structure.

FIG. 3 illustrates a downlink subframe structure.

Referring to FIG. 3, a maximum of three (four) OFDM symbols located in a front portion of a first slot within a subframe correspond to a control region to which a control channel is allocated. The remaining OFDM symbols correspond to a data region to which a physical downlink shared channel (PDSCH) is allocated. A PDSCH is used to carry a transport block (TB) or a codeword (CW) corresponding to the TB. The TB means a data block transmitted from a MAC layer to a PHY layer through a transport channel. The codeword corresponds to a coded version of a TB. The corresponding relationship between the TB and the CW depends on swiping. In the specifically, the PDSCH, TB and CW are interchangeably used. Examples of downlink control channels used in LTE include a physical control format indicator channel (PCFICH), a physical downlink control channel (PD- CCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal.

Control information transmitted through the PDCCH is referred to as downlink control information (DCI). The DCI includes resource allocation information for a UE or a UE group and other control information. For example, the DCI includes uplink/downlink scheduling information, an uplink transmit (Tx) power control command, etc. Transmission modes and information content of DCI formats for configuring a multi-antenna technology are as follows.

Transmission Mode
Transmission mode 1: Transmission from a single base station antenna port
Transmission mode 2: Transmit diversity
Transmission mode 3: Open-loop spatial multiplexing
Transmission mode 4: Closed-loop spatial multiplexing
Transmission mode 5: Multi-user MIMO
Transmission mode 6: Closed-loop rank-1 precoding
Transmission mode 7: Transmission using UE-specific reference signals DCI Format
Format 0: Resource grants for the PUSCH transmissions (uplink)
Format 1: Resource assignments for single codeword PDSCH transmissions (transmission modes 1, 2 and 7)
Format 1A: Compact signaling of resource assignments for single codeword PDSCH (all modes)
Format 1B: Compact resource assignments for PDSCH using rank-1 closed loop precoding (mod 6)
Format 1C: Very compact resource assignments for PDSCH (e.g. paging/broadcast system information)
Format 1D: Compact resource assignments for PDSCH using multi-user MIMO (mode 5)
Format 2: Resource assignments for PDSCH for closed-loop MIMO operation (mode 4)
Format 2A: Resource assignments for PDSCH for open-loop MIMO operation (mode 3)
Format 3/3A: Power control commands for PUCCH and PUSCH with 2-bit/1-bit power adjustments As described above, the PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

Figure 4:
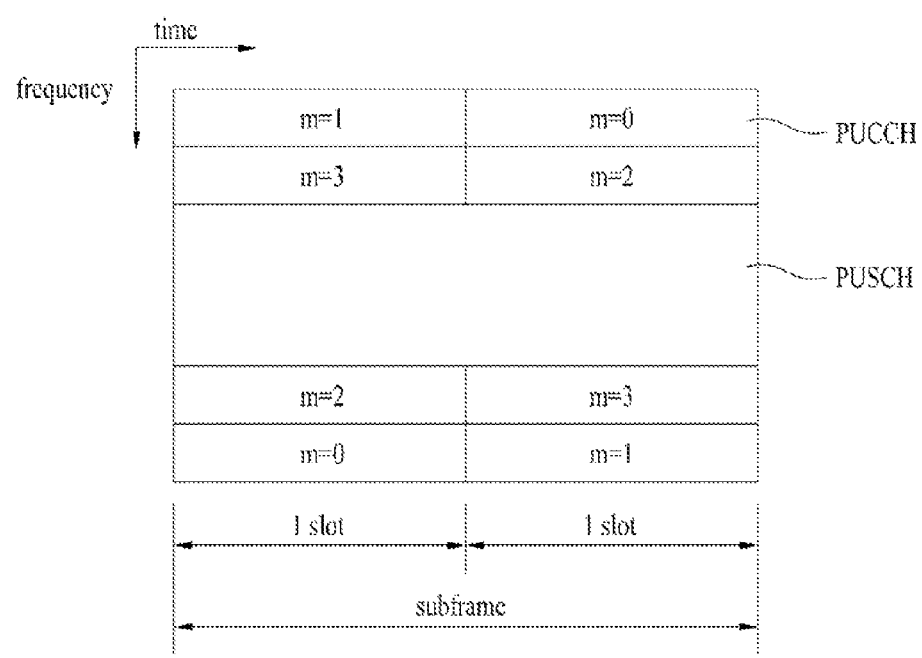
FIG. 4 illustrates an uplink subframe structure.

FIG. 4 illustrates an uplink subframe structure. Referring to FIG. 4, an uplink subframe includes a plurality of (e.g. 2) slots. A slot may include different numbers of SC-FDMA symbols according to CP lengths. The uplink subframe is divided into a control region and a data region in the frequency domain. The data region is allocated with a PUSCH and used to carry a data signal such as audio data. The control region is allocated a PUCCH and used to carry uplink control information (UCI). The PUCCH includes an RB pair located at both ends of the data region in the frequency domain and hopped in a slot boundary.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords.

Channel Quality Indicator (CQI): This is feedback information about a downlink channel. Feedback information regarding Multiple Input Multiple Output (MIMO) includes Rank Indicator (RI) and Precoding Matrix Indicator (PMI). 20 bits are used for each subframe.

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a Sounding Reference Signal (SRS) is configured, the last SC-FDMA symbol of the subframe is excluded from the SC-FDMA symbols available for control information transmission. A reference signal is used to detect coherence of the PUCCH. The PUCCH supports 7 formats according to information transmitted thereon.

Table 1 shows the mapping relationship between PUCCH formats and UCI in LTE.

TABLE 1

| PUCCH format | UCI (Uplink Control Information) |
| --- | --- |
| Format 1 | SR (Scheduling Request) (non-modulated waveform |
| Format 1a | 1-bit HARQ ACK/NACK (SR exist/non-exist) |
| Format 1b | 2-bit HARQ ACK/NACK (SR exist/non-exist) |
| Format 2 | CQI (20 coded bits) |
| Format 2 | CQI and 1- or 2-bit HARQ ACK/NACK (20 bits) (corresponding to only extended CP) |
| Format 2a | CQI and 1-bit HARQ ACK/NACK (20 + 1 coded bits) |
| Format 2b | CQI and 2-bit HARQ ACK/NACK (20 + 2 coded bits) |

Figure 5:
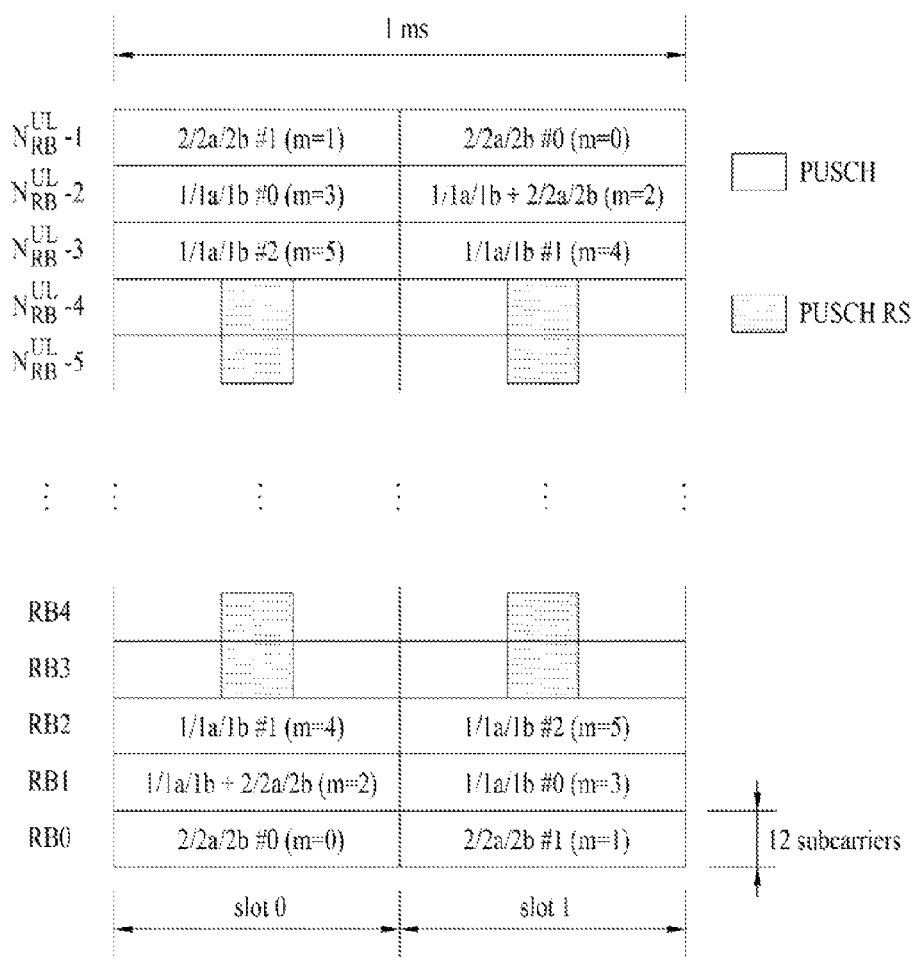
FIG. 5 illustrates an example of physically mapping a PUCCH format to a PUCCH region.

FIG. 5 illustrates an example of physically mapping a PUCCH format to a PUCCH region.

Referring to FIG. 5, PUCCH formats are mapped onto RBs in the order of PUCCH formats 2/2a/2b (CQI) (e.g. PUCCH regions m=0, 1), PUCCH formats 2/2a/2b (CQI) or PUCCH formats 1/1a/1b (SR/HARQ ACK/NACK) (e.g. PUCCH region m=2 if present), and PUCCH formats 1/1a/1b (SR/HARQ ACK/NACK) (e.g. PUCCH regions m=3, 4, 5), starting from the band-edge, and transmitted. The number of PUCCH RBs, $N_{RB}^{(2)}$, which can be used for PUCCH formats 2/2a/2b (CQI) is signaled to a UE in a cell through broadcast signaling.

The periodicity and frequency resolution to be used by a UE to report CQI are both controlled by the BS. In the time domain, both periodic and aperiodic CQI reporting are supported. The PUCCH format 2 is used for periodic CQI reporting. In periodic CQI reporting, CQI is piggybacked on data and then transmitted through a PUSCH if the PUSCH is scheduled for a subframe reserved for CQI transmission. A PUSCH is used for aperiodic CQI reporting, whereby the BS specifically instructs the UE to send an individual CQI report embedded into a resource which is scheduled for uplink data transmission.

Figure 6:
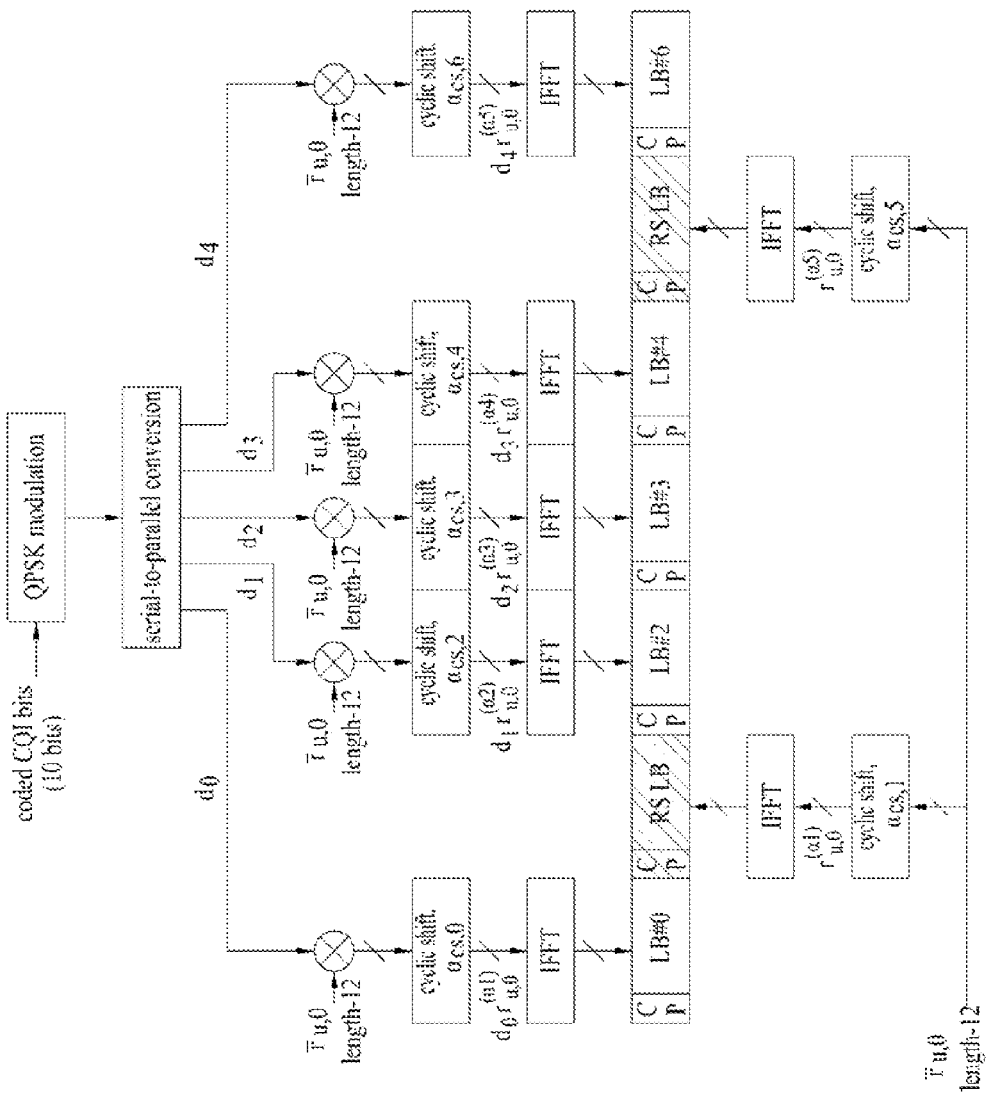
FIG. 6 illustrates a slot level structure of PUCCH format 2/2a/2b.

FIG. 6 illustrates a slot level structure of PUCCH formats 2/2a/2b. The PUCCH formats 2/2a/2b are used for CQI transmission. In the case of normal CP, SC-FDMA symbols #1 and #5 in a slot are used for transmission of a Demodulation Reference Signal (DM RS). In the case of extended CP, only SC-FDMA #3 in the slot is used for DM RS transmission.

Referring to FIG. 6, at a subframe level, 10-bit CSI is channel-coded into 20 coded bits using (20, k) Reed-Muller code punctured at a rate of ½ (not shown). The coded bits are scrambled (not shown) and then mapped to Quadrature Phase Shift Keying (QPSK) constellation (QPSK modulation). Scrambling can be performed using length-31 gold sequence in a similar manner that PUSCH data is scrambled. 10 QPSK modulation symbols are generated according to the QPSK modulation, and 5 QPSK modulation symbols $d_0$, $d_1$, $d_2$, $d_3$ and $d_4$ are transmitted through SC-FDMA symbols corresponding thereto in each slot. Each of the QPSK modulation symbols is used to modulate a lengh-12 base RS sequence $r_{u,0}$ prior to being subjected to Inverse Fast Fourier Transform (IFFT). Consequently, the RS sequence is cyclic-shifted in the time domain according to the QPSK modulation symbol value ($d_x * r_{u,0}^{(\alpha x)}$, x=0 to 4). The RS sequence multiplied by the QPSK modulation symbol is cyclic-shifted ($\alpha_{cs,x}$, x=1,5). When the number of cyclic shifts is N, N UEs can be multiplexed on the same CSI PUCCH RB. While a DM RS sequence is similar to a CSI sequence in the frequency domain, the DM RS sequence is not modulated by a CQI modulation symbol.

Parameters/resources for periodic CQI reports are configured semi-statically according to higher layer (e.g. Radio Resource Control (RRC)) signaling. If PUCCH resource index $n_{PUCCH}^{(2)}$ is set for CQI transmission, for example, CQI is periodically transmitted on a CQI PUCCH linked to PUCCH resource index $n_{PUCCH}^{(2)}$. PUCCH resource index $n_{PUCCH}^{(2)}$ indicates a PUCCH RB and cyclic shift $\alpha_{cs}$.

Figure 7:
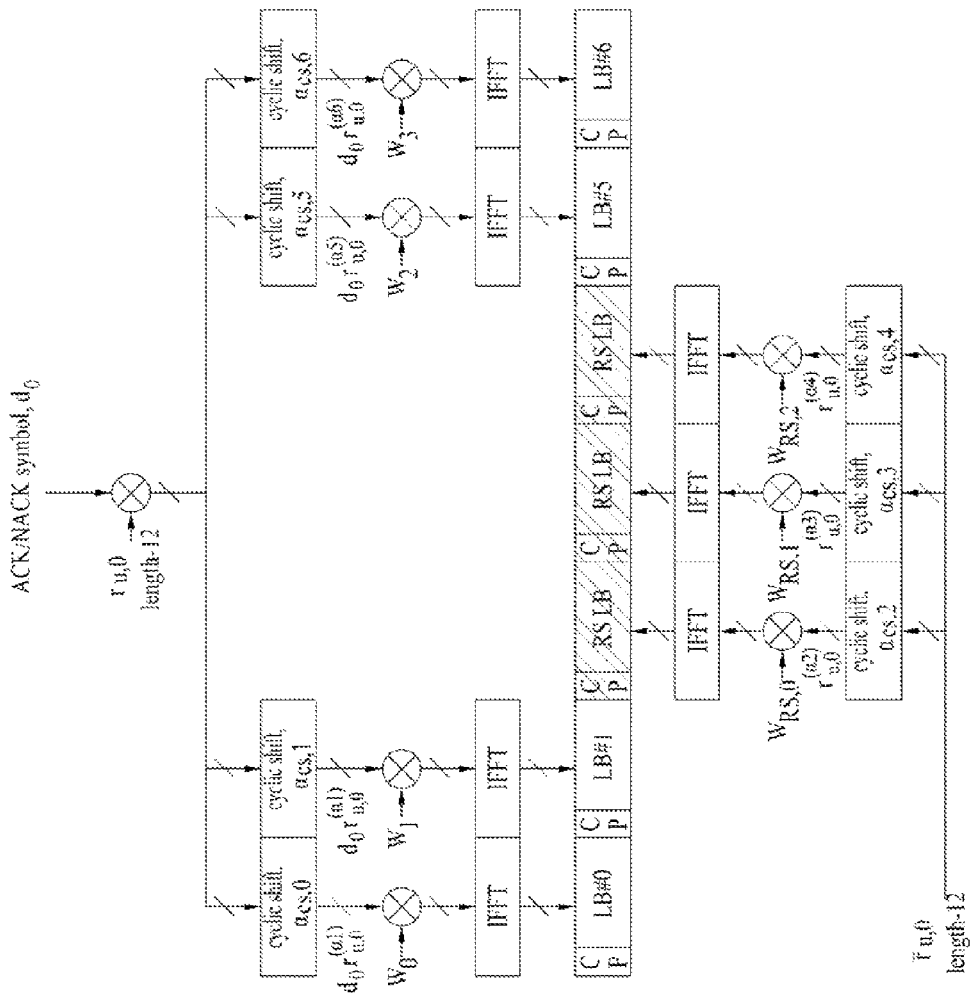
FIG. 7 illustrates a slot level structure of PUCCH format 1a/1b.

FIG. 7 illustrates a slot level structure of PUCCH formats 1a/1b. The PUCCH formats 1a/1b are used for ACK/NACK transmission. In the case of normal CP, SC-FDMA symbols #2, #3 and #4 are used for DM RS transmission. In the case of extended CP, SC-FDMA symbols #2 and #3 are used for DM RS transmission. Accordingly, 4 SC-FDMA symbols in a slot are used for ACK/NACK transmission. PUCCH format 1a/1b is called PUCCH format 1 for convenience.

Referring to FIG. 7, 1-bit [b(0)] and 2-bit [b(0)b(1)] ACK/NACK information are modulated according to BPSK and QPSK modulation schemes respectively, to generate one ACK/NACK modulation symbol $d_o$. Each bit [b(i), i=0, 1] of the ACK/NACK information indicates a HARQ response to a corresponding DL transport block, corresponds to 1 in the case of positive ACK and corresponds to 0 in case of negative ACK (HACK). Table 2 shows a modulation table defined for PUCCH formats 1a and 1b in LTE.

TABLE 2

| PUCCH format | b(0), ..., b($M_{bit}$ − 1) | d(0) |
|---|---|---|
| 1a | 0 | 1 |
|  | 1 | −1 |
| 1b | 00 | 1 |
|  | 01 | −j |
|  | 10 | j |
|  | 11 | −1 |

PUCCH formats 1a/1b perform time domain spreading using an orthogonal spreading code $W_0$, $W_1$, $W_2$, $W_3$, (e.g. Walsh-Hadamard or DFT code) in addition to cyclic shift $\alpha_{cs,x}$ in the frequency domain. In the case of PUCCH formats 1a/1b, a larger number of UEs can be multiplexed on the same PUCCH RB because code multiplexing is used in both frequency and time domains.

RSs transmitted from different UEs are multiplexed using the same method as is used to multiplex UCI. The number of cyclic shifts supported by SC-FDMA symbols for PUCCH ACK/NACK RB can be configured by cell-specific higher layer signaling parameter $\Delta_{shift}^{PUCCH}$. $\Delta_{shift}^{PUCCH} \in \{1, 2, 3\}$ represents that shift values are 12, 6 and 4, respectively. In time-domain CDM, the number of spreading codes actually used for ACK/NACK can be limited by the number of RS symbols because multiplexing capacity of RS symbols is less than that of UCI symbols due to a smaller number of RS symbols.

Figure 8:
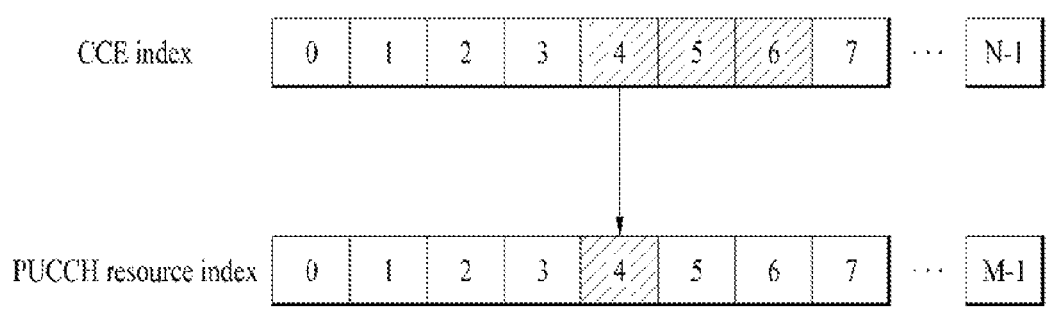
FIG. 8 illustrates an example of determining a PUCCH resource for ACK/NACK.

FIG. 8 illustrates an example of determining PUCCH resources for ACK/NACK. In LTE, a plurality of PUCCH resources for ACK/NACK are shared by a plurality of UEs in a cell every time the UEs need the PUCCH resources rather than allocated to UEs in advance. Specifically, a PUCCH resource used by a UE to transmit an ACK/NACK signal corresponds to a PDCCH on which scheduling information on DL data involving the ACK/NACK signal is delivered. The region in which the PDCCH is transmitted in a DL subframe is configured with a plurality of Control Channel Elements (CCEs), and the PDCCH transmitted to the UE is composed of one or more CCEs. The UE transmits the ACK/NACK signal through a PUCCH resource corresponding to a specific one (e.g. first CCE) of the CCEs constituting the received PDCCH.

Referring to FIG. 8, each block in a Downlink Component Carrier (DL CC) represents a CCE and each block in an Uplink Component Carrier (UL CC) indicates a PUCCH resource. Each PUCCH index corresponds to a PUCCH resource for an ACK/NACK signal. If information on a PDSCH is delivered on a PDCCH composed of CCEs #4, #5 and #6, as shown in FIG. 8, a UE transmits an ACK/NACK signal on PUCCH #4 corresponding to CCE #4, the first CCE of the PDCCH. FIG. 8 illustrates a case in which maximum M PUCCHs are present in the UL CC when maximum N CCEs exist in the DL CC. Though N can equal M, N may differ from M and CCEs are mapped to PUCCHs in an overlapped manner.

Specifically, a PUCCH resource index in LTE is determined as follows.

$$n^{(1)}_{PUCCH} = n_{CCE} + N^{(1)}_{PUCCH} \qquad \text{[Equation 1]}$$

Here, $n^{(1)}_{PUCCH}$ represents a resource index of PUCCH format 1 for ACK/NACK/DTX transmission, $N^{(1)}_{PUCCH}$ denotes a signaling value received from a higher layer, and $n_{CCE}$ denotes the smallest value of CCE indexes used for PDCCH transmission. A cyclic shift, an orthogonal spreading code and a Physical Resource Block (PRB) for PUCCH formats 1a/1b are obtained from $n^{(1)}_{PUCCH}$.

When an LTE system operates in TDD, a UE transmits one multiplexed ACK/NACK signal for a plurality of PDSCHs received through subframes at different timings. Specifically, the UE transmits one multiplexed ACK/NACK signal for a plurality of PDSCHs using an ACK/NACK channel selection scheme (PUCCH selection scheme). PUCCH selection transmission is also referred to as an ACK/NACK selection scheme. When the UE receives a plurality of DL data in the PUCCH selection transmission scheme, the UE occupies a plurality of UL physical channels in order to transmit a multiplexed ACK/NACK signal. For example, when the UE receives a plurality of PDSCHs, the UE can occupy the same number of PUCCHs as the PDSCHs using a specific CCE of a PDCCH which indicates each PDSCH. In this case, the UE can transmit a multiplexed ACK/NACK signal using combination of which one of the occupied PUCCHs is selected and modulated/coded results applied to the selected PUCCH.

Table 3 shows a PUCCH selection transmission scheme defined in LTE.

TABLE 3

| HARQ-ACK(0), HARQ-ACK(1), HARQ-ACK(2), HARQ-ACK(3) | Subframe $n^{(1)}_{PUCCH,X}$ | b(0), b(1) |
|---|---|---|
| ACK, ACK, ACK, ACK | $n^{(1)}_{PUCCH,1}$ | 1, 1 |
| ACK, ACK, ACK, NACK/DTX | $n^{(1)}_{PUCCH,1}$ | 1, 0 |
| NACK/DTX, NACK/DTX, NACK, DTX | $n^{(1)}_{PUCCH,2}$ | 1, 1 |
| ACK, ACK, NACK/DTX, ACK | $n^{(1)}_{PUCCH,1}$ | 1, 0 |
| NACK, DTX, DTX, DTX | $n^{(1)}_{PUCCH,0}$ | 1, 0 |
| ACK, ACK, NACK/DTX, NACK/DTX | $n^{(1)}_{PUCCH,1}$ | 1, 0 |
| ACK, NACK/DTX, ACK, ACK | $n^{(1)}_{PUCCH,3}$ | 0, 1 |
| NACK/DTX, NACK/DTX, NACK/DTX, NACK | $n^{(1)}_{PUCCH,3}$ | 1, 1 |
| ACK, NACK/DTX, ACK, NACK/DTX | $n^{(1)}_{PUCCH,2}$ | 0, 1 |
| ACK, NACK/DTX, NACK/DTX, ACK | $n^{(1)}_{PUCCH,0}$ | 0, 1 |
| ACK, NACK/DTX, NACK/DTX, NACK/DTX | $n^{(1)}_{PUCCH,0}$ | 1, 1 |
| NACK/DTX, ACK, ACK, ACK | $n^{(1)}_{PUCCH,3}$ | 0, 1 |
| NACK/DTX, NACK, DTX, DTX | $n^{(1)}_{PUCCH,1}$ | 0, 0 |
| NACK/DTX, ACK, ACK, NACK/DTX | $n^{(1)}_{PUCCH,2}$ | 1, 0 |
| NACK/DTX, ACK, NACK/DTX, ACK | $n^{(1)}_{PUCCH,3}$ | 1, 0 |
| NACK/DTX, ACK, NACK/DTX, NACK/DTX | $n^{(1)}_{PUCCH,1}$ | 0, 1 |
| NACK/DTX, NACK/DTX, ACK, ACK | $n^{(1)}_{PUCCH,3}$ | 0, 1 |
| NACK/DTX, NACK/DTX, ACK, NACK/DTX | $n^{(1)}_{PUCCH,2}$ | 0, 0 |
| NACK/DTX, NACK/DTX, NACK/DTX, ACK | $n^{(1)}_{PUCCH,3}$ | 0, 0 |
| DTX, DTX, DTX, DTX | N/A | N/A |

In Table 3, HARQ-ACK(i) indicates the HARQ ACK/NACK/DTX result of an i-th data unit (0≤i≤3). DTX (Discontinuous Transmission) represents that there is no transmission of a data unit corresponding to HARQ-ACK(i) or the UE does not detect the data unit corresponding to HARQ-ACK(i). In the specification, HARQ-ACK and ACK/NACK are interchangeably used. Maximum 4 PUCCH resources (i.e., $n^{(1)}_{PUCCH,0}$ to $n^{(1)}_{PUCCH,3}$) can be occupied for each data unit. The multiplexed ACK/NACK signal is transmitted through one PUCCH resource selected from the occupied PUCCH resources. In Table 3, $n^{(1)}_{PUCCH,X}$ represents a PUCCH resource actually used for ACK/NACK transmission, and b(0)b(1) indicates two bits transmitted through the selected PUCCH resource, which are modulated using QPSK. For example, when the UE has decoded 4 data units successfully, the UE transmits bits (1, 1) to a BS through a PUCCH resource linked with $n^{(1)}_{PUCCH,1}$. Since combinations of PUCCH resources and QPSK symbols cannot represent all available ACK/NACK suppositions, NACK and DTX are coupled except in some cases (NACK/DTX, N/D).

Figure 9:
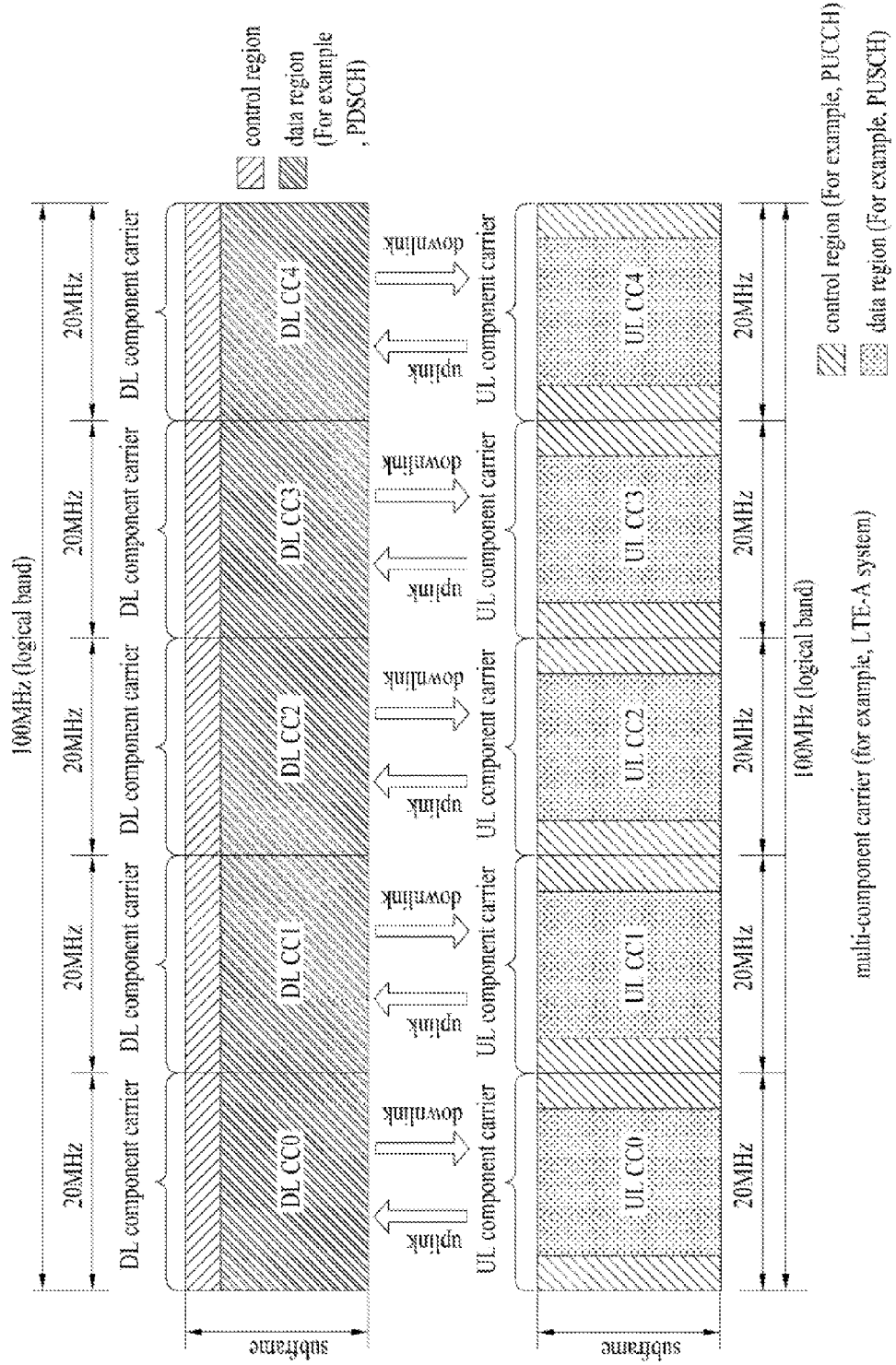
FIG. 9 illustrates a carrier aggregation (CA) communication system.

FIG. 9 illustrates a carrier aggregation (CA) communication system. To use a wider frequency band, an LTE-A system employs CA (or bandwidth aggregation) technology which aggregates a plurality of UL/DL frequency blocks to obtain a wider UL/DL bandwidth. Each frequency block is transmitted using a component carrier (CC). The CC can be regarded as a carrier frequency (or center carrier, center frequency) for the frequency block.

Referring to FIG. 9, a plurality of UL/DL CCs can be aggregated to support a wider UL/DL bandwidth. The CCs may be contiguous or non-contiguous in the frequency domain. Bandwidths of the CCs can be independently determined Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to M (<N) CCs. Various parameters with respect to CA can be set cell-specifically, UE-group-specifically, or UE-specifically. Control information may be transmitted/received only through a specific CC. This specific CC can be referred to as a Primary CC (PCC) (or anchor CC) and other CCs can be referred to as Secondary CCs (SCCs).

In LTE-A, the concept of a cell is used to manage radio resources. A cell is defined as a combination of downlink resources and uplink resources. Yet, the uplink resources are not mandatory. Therefore, a cell may be composed of downlink resources only or both downlink resources and uplink resources. The linkage between the carrier frequencies (or DL CCs) of downlink resources and the carrier frequencies (or UL CCs) of uplink resources may be indicated by system information. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only exists for a UE in an RRC_Connected state, for which CA is not set or which does not support CA. On the other hand, one or more serving cells exist, including a PCell and entire SCells, for a UE in an RRC_CONNECTED state, for which CA is set. For CA, a network may configure one or more SCells in addition to an initially configured PCell, for a UE supporting CA during connection setup after an initial security activation operation is initiated.

Figure 10:
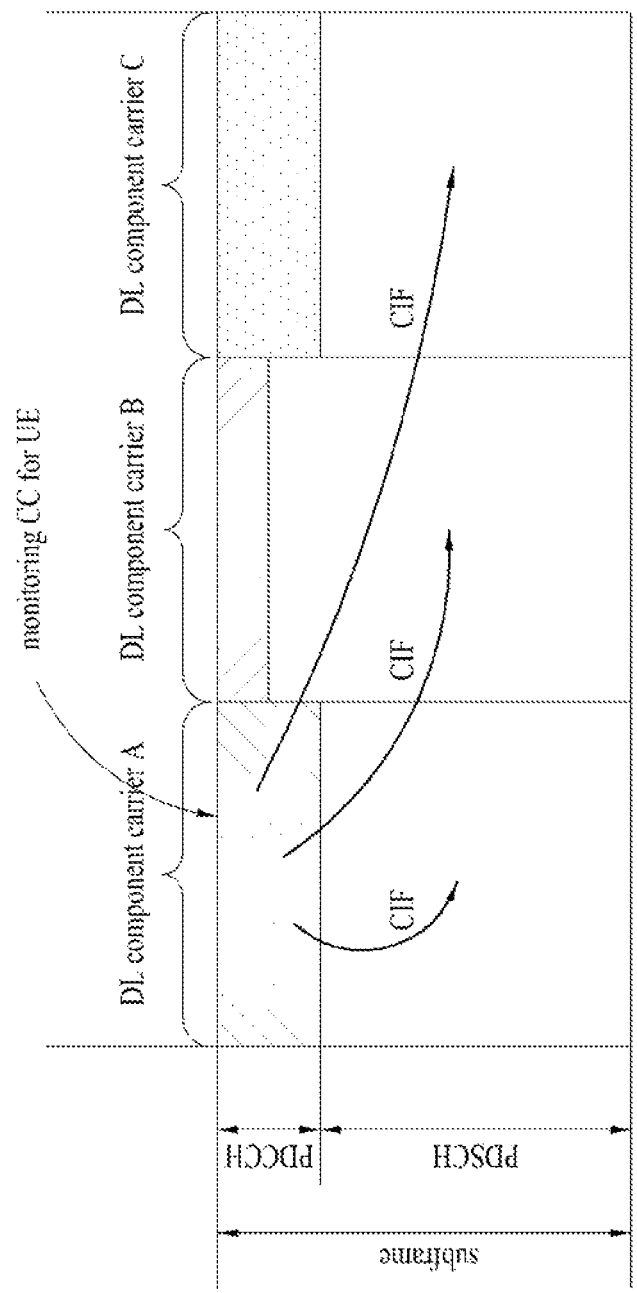
FIG. 10 illustrates scheduling in case of aggregation of a plurality of carriers.

FIG. 10 illustrates scheduling when a plurality of carriers is aggregated. It is assumed that 3 DL CCs are aggregated and DL CC A is set to a PDCCH CC. DL CC A, DL CC B and DL CC C can be called serving CCs, serving carriers, serving cells, etc. If CIF is disabled, a DL CC can transmit only a PDCCH that schedules a PDSCH corresponding to the DL CC without a CIF. When the CIF is enabled according to UE-specific (or UE-group-specific or cell-specific) higher layer signaling, DL CC A (monitoring DL CC) can transmit not only a PDCCH that schedules the PDSCH corresponding to the DL CC A but also PDCCHs that schedule PDSCHs of other DL CCs. In this case, DL CC B and DL CC C that are not set to PDCCH CCs do not deliver PDCCHs. Accordingly, the DL CC A (PDCCH CC) needs to include all of a PDCCH search space relating to the DL CC A, a PDCCH search space relating to the DL CC B and a PDCCH search space relating to the DL CC C.

LTE-A considers transmission of a plurality of ACK/NACK information/signals with respect to a plurality of PDSCHs, which are transmitted through a plurality of DL CCs, through a specific UL CC (e.g. UL PCC or UL PCell). For description, it is assumed that a UE operates in a SU-MIMO (Single User-Multiple Input Multiple Output) mode in a certain DL CC to receive 2 codewords (or transport blocks). In this case, the UE needs to be able to transmit 4 feedback states, ACK/ACK, ACK/NACK, NACK/ACK and NACK/NACK, or up to 5 feedback states including even DTX for the DL CC. If the DL CC is set to support a single codeword (or transport block), up to 3 states of ACK, NACK and DTX are present for the DL CC. Accordingly, if NACK and DTX are processed as the same state, a total of 2 feedback states of ACK and NACK/DTX are present for the DL CC. Accordingly, if the UE aggregates a maximum of 5 DL CCs and operates in the SU-MIMO mode in all CCs, the UE can have up to 55 transmittable feedback states and an ACK/NACK payload size for representing the feedback states corresponds to 12 bits. If DTX and NACK are processed as the same state, the number of feedback states is 45 and an ACK/NACK payload size for representing the same is 10 bits.

To achieve this, LTE-A considers a scheme of channel coding (e.g. Reed-Muller coding, Tail-biting convolutional coding, etc.) a plurality of ACK/NACKs and transmitting a plurality of ACK/NACK information/signals using PUCCH format 2, or a new PUCCH format (e.g. block-spread based PUCCH format). Furthermore, LTE-A discusses transmission of a plurality of ACK/NACK information/signals using PUCCH format 1A/1B and ACK/NACK multiplexing (i.e. ACK/NACK selection) in a multi-carrier situation.

Since the UE can receive data (PDSCH) through a plurality of DL CCs in a carrier aggregation system, a new scheme by which the UE transmits multi-bit HARQ-ACK information regarding a plurality of data is needed. For example, an ACK/NACK multiplexing method similar to the channel selection scheme of the LTE TDD system can be considered. The present invention proposes an ACK/NACK multiplexing (channel selection) scheme applicable to the carrier aggregation system.

A description will be given of an ACK/NACK multiplexing scheme applicable when 2 DL CCs are aggregated. However, this is exemplary and the present invention can be applied to a case in which three or more DL CCs are aggregated. Furthermore, the present invention is based on the assumption that a plurality of ACK/NACK information/signals regarding a plurality of PDSCHs, which are transmitted through a plurality of DL CCs, are transmitted through a specific UL CC (e.g. UL PCC). First, terms used in the specification will now be explained.

HARQ-ACK: this represents a reception response to a data block, that is, an ACK/NACK/DTX response (simply, ACK/NACK response). The ACK/NACK/DTX response means ACK, NACK, DTX or NACK/DTX. "HARQ-ACK for a specific CC" or "HARQ-ACK of a specific CC" represents an ACK/NACK response to a data block (e.g. PDSCH) related to the corresponding CC (e.g. a data block scheduled on the corresponding CC). An ACK/NACK state means a combination of a plurality of HAQ-ACKs. Here, the PDSCH can be replaced by a transport block or a codeword.

PUCCH index: this corresponds to a PUCCH index or a PUCCH resource index. The PUCCH resource index represents a PUCCH resource index, for example. The PUCCH resource index is mapped to at least one of an orthogonal cover (OC), a cyclic shift (CS) and a PRB. When an ACK/NACK selection scheme is applied, the PUCCH index includes a PUCCH index for PUCCH format 1a or PUCCH format 1b.

PUCCH resource linked to a CC: this indicates a PUCCH resource (refer to Equation 1, implicit PUCCH resource) linked to a PDCCH corresponding to a PDSCH on the CC, or a PUCCH resource (explicit PUCCH resource) indicated/allocated by the PDCCH corresponding to the PDSCH on the CC. The PUCCH resource can be indicated/allocated using an ARI (ACK/NACK Resource Indicator) of the PDCCH in an explicit PUCCH resource scheme.

ARI (ACK/NACK Resource Indicator): this is used to indicate a PUCCH resource. For example, the ARI can be used to indicate a resource change value (e.g. offset) for a specific PUCCH resource (group) (configured by a higher layer). Otherwise, the ARI can be used to indicate a specific PUCCH resource (group) index in a PUCCH resource (group) set (configured by a higher layer). The ARI can be included in a TPC (Transmit Power Control) field of a PDCCH corresponding to a PDSCH on an SCC. PUCCH power control is performed through a TPC field in a PDCCH (i.e. a PDCCH corresponding to a PDSCH on a PCC) that schedules the PCC. The ARI is interchangeably used with a HARQ-ACK resource indication value.

PCC PDCCH: this indicates a PDCCH that schedules a PCC. That is, the PCC PDCCH represents a PDCCH corresponding to a PDSCH on the PCC. The PCC PDCCH is transmitted only on the PCC on the assumption that cross-carrier scheduling is not permitted for the PCC. The PCC PDCCH also may indicate a PDCCH on the PCC. The meaning of the PCC PDCCH can be interpreted according to context.

SCC PDCCH: this indicates a PDCCH that schedules an SCC. That is, the SCC PDCCH represents a PDCCH corresponding to a PDSCH on the SCC. The SCC PDCCH can be transmitted on the PCC when cross-carrier scheduling is permitted for the SCC. The SCC PDCCH is transmitted only on the SCC when cross-carrier scheduling is not permitted for the SCC. The SCC PDCCH also may indicate a PDCCH on the SCC. The meaning of the SCC PDCCH can be interpreted according to context.

CC scheduling PDCCH: this indicates a PDCCH that schedules a PDSCH on a corresponding CC. That is, this represents the PDCCH corresponding to the PDSCH on the CC.

Cross-CC scheduling: this denotes an operation of scheduling/transmitting all PDCCHs through only one PCC.

Non-cross-CC scheduling: this denotes an operation of scheduling/transmitting a PDCCH that schedules each CC through the CC.

LTE-A permits cross-carrier scheduling for a DL PCC while allowing only self-carrier scheduling for a DL SCC. In this case, a PDCCH that schedules a PDSCH on the DL PCC can be transmitted only on the DL PCC. On the other hand, a PDCCH that schedules a PDSCH on the DL SCC can be transmitted on the DL PCC (cross-carrier scheduling) or transmitted on the DL SCC (self-carrier scheduling).

Table 4 shows the number of ACK/NACKs and the number of PUCCH resources according to CC configuration. When 2

CCs are aggregated, the number of ACK/NACK bits that need to be fed back can be 2, 3 or 4 according to whether each DL CC corresponds to a MIMO mode (2 CWs) or a non-MIMO mode (1 CW).

TABLE 4

| DL CC1 (primary CC) | DL CC2 (secondary CC) | Number of ACK/NACK bits | Number of PUCCH resources |
|---|---|---|---|
| Non-MIMO (1 TB) | Non-MIMO (1 TB) | 2 | 2 |
| Non-MIMO (1 TB) | MIMO (2 TBs) | 3 | 3 |
| MIMO (2 TBs) | Non-MIMO (1 TB) | 3 | 4 |
| MIMO (2 TBs) | MIMO (2 TBs) | 4 | 4 |

Mapping schemes for ACK/NACK channel selection when the number of ACK/NACK bits is 2, 3 and 4 are described below in detail. The following design bases can be considered for ACK/NACK channel selection mapping design.

Design Basis 1: Full Implicit Resource Utilization

If a UE can receive a PDCCH on a DL primary CC (DL PCC) (cross carrier scheduling) and receive a PDSCH indicated by a CIF (Carrier Indication Field) after decoding the PDCCH, the UE needs to be able to perform channel selection using only an implicit resource (refer to Equation 1) linked to a CCE constituting the PDCCH. For example, in case of a MIMO transmission mode CC (simply, MIMO CC) capable of carrying up to 2 TBs, it is possible to use 2 implicit PUCCHs #1 and #2 respectively linked to a lowest CCE index $n_{CCE}$ and the next index $n_{CCE}+1$ corresponding to a PDCCH that schedules the MIMO CC, or implicit PUCCH #1 and an explicit PUCCH configured by a higher layer (e.g. RRC layer) and indicated/allocated using an ARI. In case of a non-MIMO transmission mode CC (simply, non-MIMO CC) on which a maximum of one TB can be transmitted, one implicit PUCCH #1 linked to a lowest CCE index $n_{CCE}$ corresponding to a PDCCH that schedules the non-MIMO CC.

Design Basis 2: Reconfiguration Error Handling

When a BS changes a DL CC configuration (the number of DL CCs or a DL CC mode (e.g. MIMO, non-MIMO, etc.)) of the UE, configuration information can be transmitted only through a DL PCC during a reconfiguration period (instable time period in which the UE and the BS exchange configuration information). In this case, a serious error may be generated when there is a difference between mapping of ACK/NACK information of the DL PCC used by the UE and mapping of the DL PCC expected by the BS. Accordingly, a function of eliminating misalignment of A/N mapping between the UE and BS is needed. For this, when the UE receives a PDSCH only through the DL PCC, ACK/NACK mapping has the same format as PUCCH format 1a or 1b and ACK/NACK is transmitted using an implicit PUCCH resource linked to a DL PCC PDCCH. Alternatively, when the DL PCC (or each CW of the DL PCC) corresponds to A or N and DL SCCs (or CWs of the DL SCCs) all correspond to N/D, ACK/NACK mapping has the same format as PUCCH format 1a or 1b and ACK/NACK is transmitted using an implicit PUCCH resource linked to the DL PCC PDCCH. This scheme is referred to as PCC fallback for convenience.

Design Basis 3: Always Reserve Second Resource of MIMO DL CC

Even if a certain DL CC is configured as the MIMO mode, it is possible to dynamically receive a single CW in the DL CC using PDCCH format 1A. However, the present invention assumes that 2 dynamic (implicit) resources can be used in a MIMO CC all the time irrespective of the number of CWs actually received in a DL CC configured as the MIMO mode.

For example, a scheme of simultaneously using a resource linked to the first CCE (index $n_{CCE}$) of a PDCCH that schedules the MIMO CC and a resource linked to the second CCE ($n_{CCE}+1$) all the time can be considered.

Design Basis 4: NACK/DTX Coupling

To reduce the quantity of A/N feedback that needs to be transmitted by the UE, it is assumed that an explicit DTX state (state in which a PDCCH has not been received) is not transmitted and a DTX state is coupled with a NACK state and transmitted. Description of the present invention is based on the assumption that NACK and DTX states are coupled. Accordingly, unless otherwise specifically stated, NACK (N) may mean NACK or DTX.

Detailed descriptions will be given of ACK/NACK mapping schemes according to design bases 1 to 4 when the number of ACK/NACK bits is 2, 3 and 4. In regard to design basis 2, the schemes can be divided into embodiments 1 and 2 with respect to the number of CWs capable of being received by the UE on the DL PCC during the reconfiguration period.

Embodiment 1

Single CW (or TB) Fallback

It is assumed that only a single CW is permitted to be received on the DL PCC during the reconfiguration period. When the PCC fallback condition is satisfied, a corresponding ACK/NACK state is mapped such that it has the same constellation as PUCCH format 1a (BPSK) (referred to as single CW fallback).

2-Bit ACK/NACK Mapping

Figure 11:
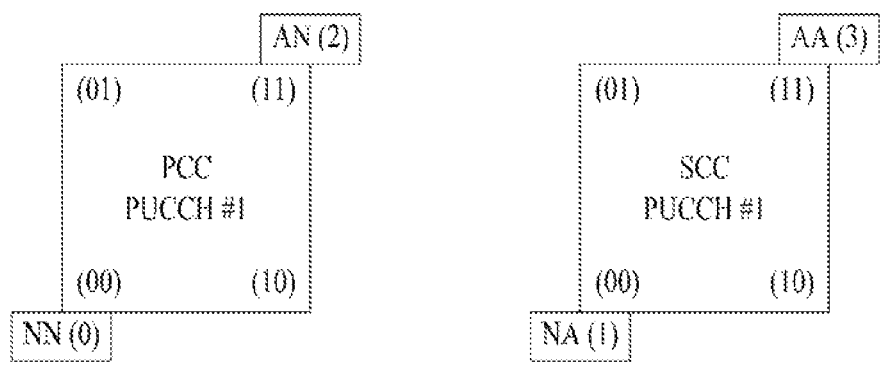

FIG. 11 illustrates a 2-bit ACK/NACK mapping method according to an embodiment of the present invention. This method corresponds to a case in which the non-MIMO DL PCC and the non-MIMO DL SCC are aggregated in Table 4.

Referring to FIG. 11, ACK/NACK of the DL PCC may be allocated to an MSB (Most Significant bit) and ACK/NACK of the DL SCC may be allocated to an LSB (Least Significant Bit). In addition, NN (state #0) and AN (state #2) are allocated to BPSK constellation points (corresponding to QPSK constellation points (00) and (11)) corresponding to a resource (PCC PUCCH #1) linked to a PCC PDCCH. According to the present embodiment, it is possible to satisfy all the above-described design bases including PCC single CW fallback. To optimize ACK/NACK mapping performance, NA (state #1) and AA (state #3) may be allocated to BPSK constellation points (corresponding to QPSK constellation point (00) and (11)) corresponding to SCC PUCCH #1. In case of SCC PUCCH #1, NA (state #1) and AA (state #3) may also be allocated to different constellation points (01) and (10) which maximize a Euclidean distance between ACK/NACK states.

Table 5 is a 2-bit ACK/NACK mapping table according to the present embodiment. Table 5 lists ACK/NACK states and complex modulation values corresponding thereto. Table 2 refers to a modulation method. When PCC fallback is not applied, the present invention includes a case in which columns Ch1 and Ch2 of the Table 5 are changed.

TABLE 5

| HARQ-ACK(0), HARQ-ACK(1) | Ch1 (PCC PUCCH #1) | Ch2 (SCC PUCCH #1) |
|---|---|---|
| NN (state #0) | +1 | 0 |
| NA (state #1) | 0 | +1 |
| AN (state #2) | −1 | 0 |
| AA (state #3) | 0 | −1 |

Here, HARQ-ACK(0) denotes a HARQ ACK(A)/NACK(N)/DTX(D) result with respect to a PDSCH on the PCC (or SPS release PDCCH on the PCC). HARQ-ACK(1) denotes a HARQ ACK(A)/NACK(N)/DTX(D) result with respect to a PDSCH on the SCC. N represents NACK or DTX. PCC PUCCH #1 indicates a PUCCH resource (index) linked to a CCE constituting a PCC PDCCH. SCC PUCCH #1 indicates a PUCCH resource (index) linked to a CCE constituting an SCC PDCCH (in case of cross-carrier scheduling) or a PUCCH resource (index) indicated/allocated using an ARI (in case of non-cross-carrier scheduling).

3-Bit ACK/NACK Mapping

This corresponds to a case in which the DL PCC corresponds to MIMO and the DL SCC corresponds to non-MIMO (first case) and a case in which the DL PCC corresponds to non-MIMO and the DL SCC corresponds to MIMO (second case) in Table 4. The present embodiment proposes a mapping scheme applicable to both the first and second cases.

Figure 13:
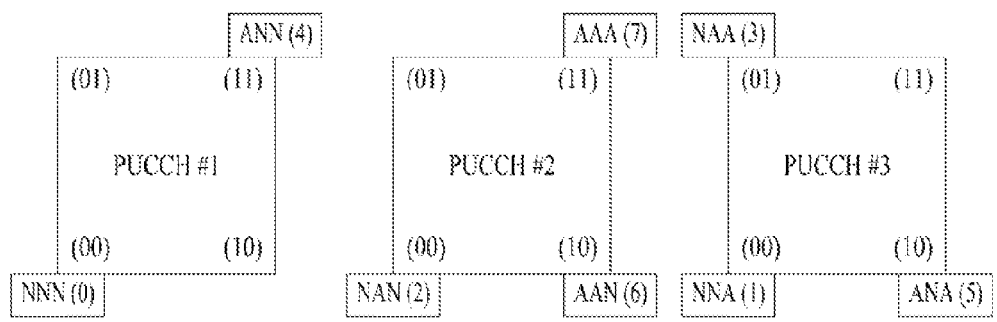
Figure 14:
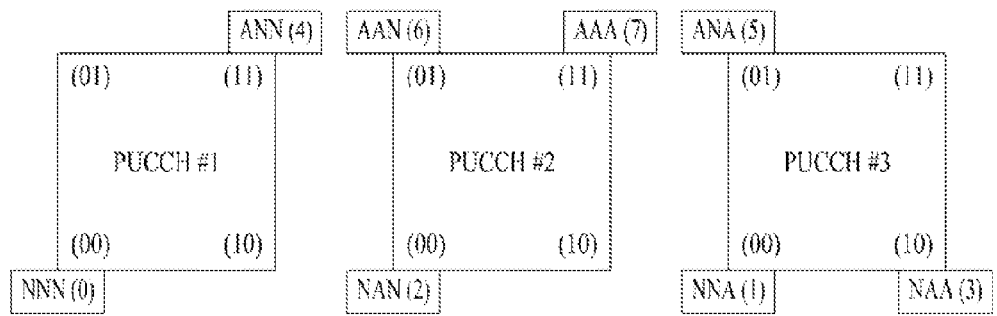

FIGS. 12, 13 and 14 illustrate a 3-bit ACK/NACK mapping method according to an embodiment of the present invention. The present embodiment is based on the assumption that a MIMO CC and a non-MIMO CC are aggregated.

In case of MIMO PCC+non-MIMO SCC, resources linked to a PCC PDCCH correspond to PUCCHs #1 and #2 and a resource linked to an SCC PDCCH corresponds to PUCCH #3. 2-bit ACK/NACK information regarding a TB of the MIMO PCC may be allocated to 2 MSBs of the entire ACK/NACK information and 1-bit ACK/NACK information regarding a TB of the non-MIMO SCC may be allocated to an LSB of the entire ACK/NACK information. The entire ACK/NACK information corresponds to an ACK/NACK state (i.e. a plurality of ACK/NACKs).

On the contrary, in case of non-MIMO PCC+MIMO SCC, a resource linked to the PCC PDCCH is PUCCH #1 and resources linked to the SCC PDCCH are PUCCHs #2 and #3. In this case, 1-bit ACK/NACK information regarding a TB of the non-MIMO PCC may be allocated to an MSB of the entire ACK/NACK information and 2-bit ACK/NACK information regarding a TB of the MIMO SCC may be allocated to 2 LSBs of the entire ACK/NACK information.

Alternatively, resources linked to a MIMO CC PDCCH may be PUCCHs #1 and #2 and a resource linked to a non-MIMO CC PDCCH may be PUCCH #3 without discriminating the PCC and SCC from each other. In this case, 2-bit ACK/NACK information regarding a TB of a MIMO CC may be allocated to 2 MSBs of the entire ACK/NACK information and 1-bit ACK/NACK information regarding a TB of a non-MIMO CC may be allocated to an LSB of the entire ACK/NACK information.

When the order of ACK/NACK bits allocated to MSB and LSB in the entire ACK/NACK information is changed according to MIMO/non-MIMO configuration, the order of PUCCH resources may also be changed. For example, when the order of the ACK/NACK bits allocated to LSB and MSB is changed, columns can be changed in an ACK/NACK mapping table of the following table 6. For example, the order of PUCCH #1, PUCCH #2 and PUCCH #3 can be changed to the order of PUCCH #3, PUCCH #2 and PUCCH #1.

For mapping that satisfies all the design bases 1 to 4, options 1, 2, 3 and 4 of FIG. 12 can be considered. For example, in case of option 1, NNN (state #0) and ANN (state #4) are mapped to PUCCH #1, NAN (state #2) AAA (state #7) and AAN (#6) are mapped to PUCCH #2, and NAA (state #3), ANA (state #5) and NNA (state #1) are mapped to PUCCH #3.

For optimization of ACK/NACK response performance, mapping of ACK/NACK states to PUCCH resources can be configured such that a Hamming distance between neighbouring states in the QPSK constellation is minimized (e.g. gray coding is used) and a Euclidian distance between ACK/NACK states in the constellation is maximized. FIG. 13 illustrates an example of mapping option 1 to PUCCH resources.

In case of option 1, various applications for maximizing gray coding and a Euclidian distance between ACK/NACK states (e.g. constellation rotation) are applicable. FIG. 14 illustrates a modification of ACK/NACK mapping of FIG. 13. Referring to FIG. 14, for PUCCHs #2 and #3, gray coding is maintained while ACK/NACK states are mapped to QPSK constellation points different from those of FIG. 13.

Tables 6 and 7 are ACK/NACK mapping tables according to FIGS. 13 and 14.

TABLE 6

| HARQ-ACK(0), HARQ-ACK(1), HARQ-ACK(2) | PUCCH #1 | PUCCH #2 | PUCCH #3 |
|---|---|---|---|
| NNN (state #0) | +1 | 0 | 0 |
| NNA (state #1) | 0 | 0 | +1 |
| NAN (state #2) | 0 | +1 | 0 |
| NAA (state #3) | 0 | 0 | +j |
| ANN (state #4) | −1 | 0 | 0 |
| ANA (state #5) | 0 | 0 | −j |
| AAN (state #6) | 0 | −j | 0 |
| AAA (state #7) | 0 | −1 | 0 |

TABLE 7

| HARQ-ACK(0), HARQ-ACK(1), HARQ-ACK(2) | PUCCH #1 | PUCCH #2 | PUCCH #3 |
|---|---|---|---|
| NNN | +1 | 0 | 0 |
| NNA | 0 | 0 | +j |
| NAN | 0 | +1 | 0 |
| NAA | 0 | 0 | −j |
| ANN | −1 | 0 | 0 |
| ANA | 0 | 0 | +j |
| AAN | 0 | +j | 0 |
| AAA | 0 | −1 | 0 |

In Tables 6 and 7, in case of MIMO PCC+non-MIMO SCC, HARQ-ACKs(0) and (1) may denote HARQ ACK(A)/NACK(N)/DTX(D) results with respect to a PDSCH on the PCC (or SPS release PDCCH on the PCC) and HARQ-ACK(2) may denote a HARQ ACK(A)/NACK(N)/DTX(D) result with respect to a PDSCH on the SCC. N represents NACK or DTX. PUCCHs #1 and #2 may indicate PUCCH resources (indexes) linked to a lowest CCE $n_{CCE}$ and the following CCE index $n_{CCE}$+1 corresponding to a PCC PDCCH. PUCCH #3 may indicate a PUCCH resource (index) linked to a CCE constituting an SCC PDCCH (in case of cross-carrier scheduling) or a PUCCH resource (index) indicated/allocated using an ARI (in case of non-cross-carrier scheduling).

In Tables 6 and 7, in case of non-MIMO PCC+MIMO SCC, HARQ-ACK(0) may denote a HARQ ACK(A)/NACK(N)/DTX(D) result with respect to a PDSCH on the PCC (or SPS release PDCCH on the PCC) and HARQ-ACKs(1) and (2) may denote HARQ ACK(A)/NACK(N)/DTX(D) results with respect to a PDSCH on the SCC. N represents NACK or DTX. PUCCH #1 may indicate a PUCCH resource (index) linked to a lowest CCE $n_{CCE}$ corresponding to a PCC PDCCH. PUCCHs #2 and #3 may indicate PUCCH resources (indexes) linked to a lowest CCE $n_{CCE}$ and the following CCE index $n_{CCE}$+1 corresponding to an SCC PDCCH (in case of cross-carrier scheduling) or PUCCH resources (indexes) indicated/allocated using an ARI (in case of non-cross-carrier scheduling).

As described above with reference to FIGS. 13 and 14, in options 2, 3 and 4, each ACK/NACK state can be mapped to a QPSK symbol on a corresponding PUCCH resource in consideration of schemes for maximizing gray coding and Euclidean distance.

In the above-mentioned ACK/NACK mapping schemes, ACK/NACK performance may be different according to ACK/NACK bits. This is because different numbers (types) of resources may be used for ACK/NACK bits to select ACK/NACK and QPSK constellation utilization format may be different for ACK/NACK bits. To solve unequal ACK/NACK performance, a scheme of changing the position of each ACK/NACK in an ACK/NACK state according to a predetermined rule can be considered. It is possible to equalize performances of ACK/NACK bits by changing positions of ACK/NACKs in an ACK/NACK state.

Specifically, the position of each ACK/NACK can be changed with time in an ACK/NACK state. For example, when an SCC is set to MIMO, ACK/NACK for the first TB of the SCC can be located at the second ACK/NACK position and ACK/NACK for the second TB can be allocated to the third ACK/NACK position (i.e. LSB) at a specific point of time. The ACK/NACK for the first TB of the SCC can be allocated to the third ACK/NACK position and the ACK/NACK for the second TB can be allocated to the second ACK/NACK position at a different time. In this manner, positions of individual ACK/NACKs can be changed in an ACK/NACK state to equalize ACK/NACK performance for the 2 TBs of the SCC in the time domain.

Positions of individual ACK/NACKs in an ACK/NACK state may be changed on a subframe basis. For example, the ACK/NACK for the first TB of the SCC can be allocated to the second ACK/NACK position and the ACK/NACK for the second TB can be allocated to the third ACK/NACK position in an even-numbered subframe, whereas the ACK/NACK for the first TB of the SCC can be allocated to the third ACK/NACK position and the ACK/NACK for the second TB can be allocated to the second ACK/NACK position in an odd-numbered subframe, or vice versa.

Furthermore, positions of individual ACK/NACKs in an ACK/NACK state may be changed on a slot basis while being maintained for subframes. For example, the ACK/NACK for the first TB of the SCC can be allocated to the second ACK/NACK position and the ACK/NACK for the second TB can be allocated to the third ACK/NACK position in an even-numbered slot, whereas the ACK/NACK for the first TB of the SCC can be allocated to the third ACK/NACK position and the ACK/NACK for the second TB can be allocated to the second ACK/NACK position in an odd-numbered slot, or vice versa.

The above-described ACK/NACK performance equalization scheme exemplifies a case in which only the order of ACK/NACKs corresponding to the TBs of the SCC is changed in consideration of PCC fallback. However, if PCC fallback is not considered, ACK/NACK performance can be equalized in various manners. For example, the above-described ACK/NACK performance equalization scheme can be equally applied to a case in which the PCC is set to the MIMO mode. Alternatively, ACK/NACKs corresponding to TBs of the PCC and SCC may be mixed in an ACK/NACK state without discriminating the PCC and SCC from each other.

4-Bit ACK/NACK Mapping

FIGS. 15 and 16 illustrate a 4-bit ACK/NACK mapping method according to an embodiment of the present invention. This method corresponds to a case in which both the DL PCC and DL SCC correspond to the MIMO mode.

Referring to FIGS. 15 and 16, 4 PUCCH resources are used for ACK/NACK channel selection. Resources linked to a PCC PDCCH are PCC PUCCHs #1 and #2 and resources linked to an SCC PDCCH are SCC PUCCHs #1 and #2. In this case, 2-bit ACK/NACK information regarding a TB of the MIMO DL PCC can be allocated to 2 MSBs of the entire ACK/NACK information and 2-bit ACK/NACK information regarding a TB of the MIMO DL SCC can be allocated to 2 LSBs of the entire ACK/NACK information. The entire ACK/NACK information corresponds to an ACK/NACK state (i.e. a plurality of ACK/NACKs). For mapping that satisfies all the design bases 1 to 4, options 1, 2, 3 and 4 of FIG. 15 can be considered.

For optimization of ACK/NACK response performance, mapping of ACK/NACK states to PUCCH resources can be configured such that a Hamming distance between neighbouring states in the QPSK constellation is minimized (e.g. gray coding is used) and a Euclidian distance between ACK/NACK states in the constellation is maximized. FIG. 16 illustrates an example of mapping option 1 to PUCCH resources.

Referring to FIG. 16, to support single CW fallback, NNNN (state #0) and ANNN (state #8) are mapped to QPSK constellation points (00) and (11) corresponding to a first resource (PCC PUCCH #1) linked to the PCC PDCCH. The QPSK constellation points (00) and (11) correspond to the constellation for PUCCH format 1a (BPSK). 2 states in PCC PUCCH #1 are mapped to QPSK constellation points (01) and (10). Gray coding cannot be satisfied in PCC PUCCH #1 due to restrictions on single CW fallback. However, in case of PCC PUCCH #2 and SCC PUCCHs #1 and #2, ACK/NACK mapping can be configured as shown in the figure so as to maximize gray coding and Euclidean distance for optimization of ACK/NACK response performance.

Table 8 shows an ACK/NACK mapping table according to FIG. 16.

TABLE 8

| HARQ-ACK(0), HARQ-ACK(1), HARQ-ACK(2), HARQ-ACK(3) | PCC PUCCH #1 | PCC PUCCH #2 | SCC PUCCH #1 | SCC PUCCH #2 |
|---|---|---|---|---|
| NNNN (state #0) | +1 | 0 | 0 | 0 |
| NNNA (state #1) | 0 | 0 | +1 | 0 |
| NNAN (state #2) | 0 | 0 | 0 | +1 |
| NNAA (state #3) | 0 | 0 | +j | 0 |
| NANN (state #4) | +j | 0 | 0 | 0 |
| NANA (state #5) | 0 | +1 | 0 | 0 |
| NAAN (state #6) | 0 | 0 | 0 | +j |
| NAAA (state #7) | 0 | +j | 0 | 0 |
| ANNN (state #8) | −1 | 0 | 0 | 0 |
| ANNA (state #9) | 0 | 0 | −j | 0 |
| ANAN (state #10) | 0 | 0 | 0 | −j |
| ANAA (state #11) | 0 | 0 | −1 | 0 |
| AANN (state #12) | −j | 0 | 0 | 0 |
| AANA (state #13) | 0 | −j | 0 | 0 |
| AAAN (state #14) | 0 | 0 | 0 | −1 |
| AAAA (state #15) | 0 | −1 | 0 | 0 |

In Table 8, HARQ-ACKs(0) and (1) denote HARQ ACK (A)/NACK(N)/DTX(D) results with respect to a PDSCH on the PCC (or SPS release PDCCH on the PCC) and HARQ-ACKs(2) and (3) denote HARQ ACK(A)/NACK(N)/DTX (D) results with respect to a PDSCH on the SCC. N represents NACK or DTX. PCC PUCCHs #1 and #2 may indicate PUCCH resources (indexes) linked to a lowest CCE $n_{CCE}$ and the following CCE index $n_{CCE}$+1 corresponding to the PCC PDCCH. SCC PUCCH #1 and #2 may indicate PUCCH resources (indexes) linked to a lowest CCE $n_{CCE}$ and the following CCE index $n_{CCE}$+1 corresponding to the SCC PDCCH (in case of cross-carrier scheduling) or PUCCH resources (indexes) indicated/allocated using an ARI (in case of non-cross-carrier scheduling).

In case of option 1, various applications for maximizing gray coding and a Euclidian distance between ACK/NACK states (e.g. constellation rotation) are available. Furthermore, various schemes for maximizing gray coding and a Euclidian distance between ACK/NACK states, as described above, can be considered in case of options 2, 3 and 4. In addition, a mapping scheme of changing bundles of 4 states, which are respectively mapped to SCC PUCCH #1 and SCC PUCCH #2, can be applied to all options. For example, in case of option 1, ACK/NACK states are allocated to PCC PUCCHs #1/#2 as illustrated in FIG. 16, whereas states #2, #6, #14 and #10 can be allocated to SCC PUCCH #1 and #1, #2, #11 and #9 can be allocated to SCC PUCCH #2.

In the above-mentioned ACK/NACK mapping schemes, ACK/NACK performance may be different according to ACK/NACK bits. This is because different numbers (types) of resources may be used for ACK/NACK bits to select ACK/NACK and QPSK constellation utilization format may be different for ACK/NACK bits. To solve unequal ACK/NACK performance, a scheme of changing the position of each ACK/NACK in an ACK/NACK state according to a predetermined rule can be considered. It is possible to equalize performances of ACK/NACK bits by changing positions of ACK/NACKs in an ACK/NACK state.

Specifically, the position of each ACK/NACK can be changed with time in an ACK/NACK state. For example, ACK/NACK for the first TB of the SCC can be located at the third ACK/NACK position and ACK/NACK for the second TB can be allocated to the fourth ACK/NACK position (i.e. LSB) at a specific point of time. The ACK/NACK for the first TB of the SCC can be allocated to the fourth ACK/NACK position and the ACK/NACK for the second TB can be allocated to the third ACK/NACK position at a different time. In this manner, positions of individual ACK/NACKs can be changed in an ACK/NACK state to equalize ACK/NACK performance for the 2 TBs of the SCC in the time domain.

Positions of individual ACK/NACKs in an ACK/NACK state may be changed on a subframe basis. For example, the ACK/NACK for the first TB of the SCC can be allocated to the third ACK/NACK position and the ACK/NACK for the second TB can be allocated to the fourth ACK/NACK position in an even-numbered subframe, whereas the ACK/NACK for the first TB of the SCC can be allocated to the fourth ACK/NACK position and the ACK/NACK for the second TB can be allocated to the third ACK/NACK position in an odd-numbered subframe, or vice versa.

Furthermore, positions of individual ACK/NACKs in an ACK/NACK state may be changed on a slot basis while being maintained for subframes. For example, the ACK/NACK for the first TB of the SCC can be allocated to the third ACK/NACK position and the ACK/NACK for the second TB can be allocated to the fourth ACK/NACK position in an even-numbered slot, whereas the ACK/NACK for the first TB of the SCC can be allocated to the fourth ACK/NACK position and the ACK/NACK for the second TB can be allocated to the third ACK/NACK position in an odd-numbered slot, or vice versa.

The above-described ACK/NACK performance equalization scheme exemplifies a case in which only the order of ACK/NACKs corresponding to the TBs of the SCC is changed in consideration of PCC fallback. However, even if PCC fallback is applied, it is possible to change the order of ACK/NACK for the second TB of the PCC and ACK/NACKs for the TBs of the SCC in an ACK/NACK state.

If PCC fallback is not considered, it is possible to equalize ACK/NACK performance in a wider variety of manners. For example, the above-described ACK/NACK performance equalization scheme can be equally applied to the PCC. Furthermore, positions of ACK/NACKs corresponding to TBs of the PCC and SCC can be changed without restriction in an ACK/NACK state.

Embodiment 2

2-CW (or 2-TB) Fallback

It is assumed that up to 2 CWs are permitted to be received on the DL PCC during the reconfiguration period. In this case, when the PCC fallback condition is satisfied, a corresponding ACK/NACK state is mapped such that it has the same constellation as PUCCH format 1b (BPSK) (referred to as 2-CW fallback).

2-Bit ACK/NACK Mapping 2-bit ACK/NACK mapping corresponds to 2-bit ACK/NACK mapping in case of single CW fallback because a DL CC in the MIMO mode is not present. Accordingly, detailed description refers to the 2-bit ACK/NACK mapping schemes of embodiment 1. Specifically, the 2-bit ACK/NACK mapping schemes correspond to the scheme shown in FIG. 11 and modifications thereof.

3-Bit ACK/NACK Mapping

This corresponds to a case in which the DL PCC corresponds to MIMO and the DL SCC corresponds to non-MIMO (first case) and a case in which the DL PCC corresponds to non-MIMO and the DL SCC corresponds to MIMO (second case) in Table 4. 2-CW fallback (mapping in the same manner as in PUCCH format 1b) needs to be supported when the DL PCC is set to the MIMO mode and single CW fallback (mapping in the same manner as in PUCCH format 1a) needs to be supported when the DL PCC is set to the non-MIMO mode. Furthermore, a mapping scheme applicable to both the first and second cases is preferable.

Figure 17:
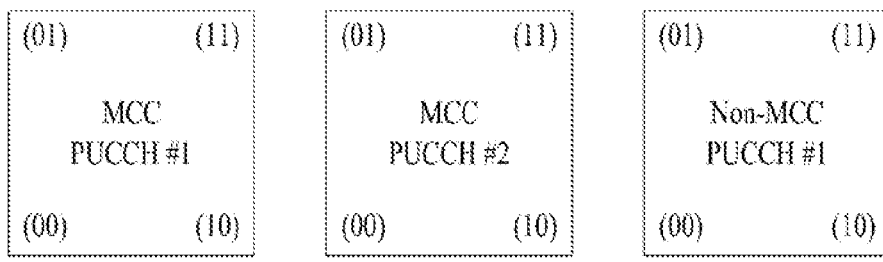
Figure 18:
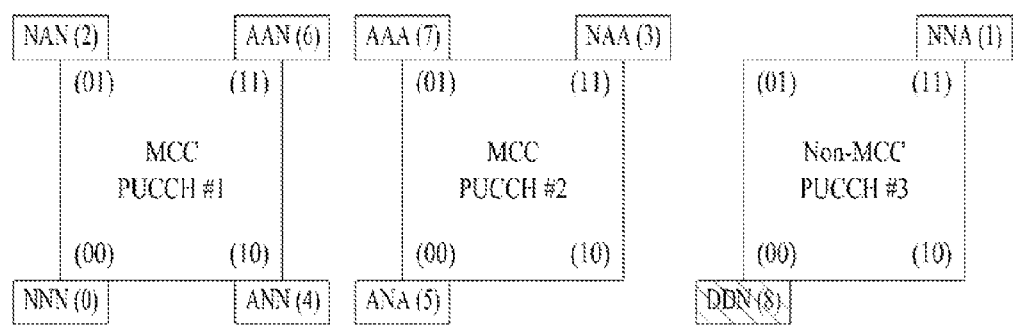

FIGS. 17 and 18 illustrate a 3-bit ACK/NACK mapping method according to an embodiment of the present invention. The present embodiment is based on the assumption that a MIMO CC and a non-MIMO CC are aggregated.

In case of MIMO PCC+non-MIMO SCC, resources linked to a PCC PDCCH correspond to PUCCHs #1 and #2 and a resource linked to an SCC PDCCH corresponds to PUCCH #3 (not shown). 2-bit ACK/NACK information regarding a TB of the MIMO PCC may be allocated to 2 MSBs of the entire ACK/NACK information and 1-bit ACK/NACK information regarding a TB of the non-MIMO SCC may be allocated to an LSB of the entire ACK/NACK information. The entirety of the ACK/NACK information corresponds to an ACK/NACK state (i.e. a plurality of ACK/NACKs).

On the contrary, in case of non-MIMO PCC+MIMO SCC, a resource linked to the PCC PDCCH is PUCCH #1 and resources linked to the SCC PDCCH are PUCCHs #2 and #3 (not shown). In this case, 1-bit ACK/NACK information regarding a TB of the non-MIMO PCC may be allocated to an MSB of the entire ACK/NACK information and 2-bit ACK/NACK information regarding a TB of the MIMO SCC may be allocated to 2 LSBs of the entire ACK/NACK information.

Alternatively, resources linked to a MIMO CC PDCCH may be PUCCHs #1 and #2 and a resource linked to a non- MIMO CC PDCCH may be PUCCH #2 without discriminating the PCC and SCC from each other. In this case, 2-bit ACK/NACK information regarding a TB of a MIMO CC may be allocated to 2 MSBs of the entire ACK/NACK information and 1-bit ACK/NACK information regarding a TB of a non-MIMO CC may be allocated to an LSB of the entire ACK/NACK information.

When the order of ACK/NACK bits allocated to MSB and LSB in the entire ACK/NACK information is changed according to MIMO/non-MIMO configuration, the order of PUCCH resources may also be changed. For example, when the order of the ACK/NACK bits allocated to LSB and MSB is changed, columns can be changed in an ACK/NACK mapping table of the following table 9. For example, the order of MIMO PUCCH #1 (PUCCH #1), MIMO PUCCH #2 (PUCCH #2) and non-MIMO PUCCH #1 (PUCCH #3) can be changed to the order of non-MIMO PUCCH #1 (PUCCH #3), MIMO PUCCH #2 (PUCCH #2) and MIMO PUCCH #1 (PUCCH #1).

For mapping that satisfies all the design bases 1 to 4, options 1, 2, 3 and 4 of FIG. 17 can be considered. For example, in case of option 1, NNN (state #0), NAN (state #2), AAN (state #6) and ANN (state #4) are mapped to MCC PUCCH #1, ANA (state #5), AAA (state #7), NAA (state #3) are mapped to MCC PUCCH #2, and NNA (state #1) and DDN (state #8) are mapped to non-MIMO PUCCH #1.

Referring to FIG. 17, a state, that is, DDN (state #8) is added, distinguished from the single-CW fallback case (refer to FIG. 12). DDN (state #8) is added to execute the single CW fallback function when the PCC is set to the non-MIMO mode. DDN (state #8) corresponds to a case in which the UE has not received an SCC (MIMO mode) PDCCH (i.e. DTX, DD) and a PCC PDSCH is processed as NACK. DDN (state #8) can be regarded as decoupling NNN (state #0) into NNN (state #0) and DDN (state #8). That is, NNN (state #0) is transmitted when 2 CWs correspond to NACK although the SCC PDCCH has been received and a PCC PDCCH has not been received or a PDSCH corresponds to NACK even if the PCC PDCCH has been received. In this case, NNN (state #0) indicates NND or NNN. When the SCC PDCCH has not been received and the PDD PDSCH corresponds to NACK, DDN (state #8) is transmitted.

For optimization of ACK/NACK response performance, mapping of ACK/NACK states to PUCCH resources can be configured such that a Hamming distance between neighboring states in the QPSK constellation is minimized (e.g. gray coding is used) and a Euclidian distance between ACK/NACK states in the constellation is maximized. FIG. 18 illustrates an example of mapping option 1 to PUCCH resources.

Referring to FIG. 18, states #0, #2, #6 and #4 allocated to MCC PUCCH #1 are respectively mapped to QPSK constellation points (00), (01), (11) and (10) as in PUCCH format 1b (QPSK) to support fallback when the PCC is set to the MIMO mode. States #5, #7 and #3 allocated to MCC PUCCH #2 are subjected to gray coding and are mapped to QPSK constellation points (00), (01) and (11) such that Euclidean distance is maximized. Similarly, non-MCC PUCCH #1 is subjected to gray coding and is mapped such that Euclidean distance is maximized.

In case of option 1, various applications for maximizing gray coding and a Euclidian distance between ACK/NACK states (e.g. constellation rotation) can be employed (refer to FIG. 14).

Table 9 is an ACK/NACK mapping table according to FIG. 18.

TABLE 9

| HARQ-ACK(0), HARQ-ACK(1), HARQ-ACK(2) | MIMO PUCCH #1 | MIMO PUCCH #2 | Non-MIMO PUCCH #1 |
|---|---|---|---|
| NNN (state #0) | +1 | 0 | 0 |
| NNA (state #1) | 0 | 0 | −1 |
| NAN (state #2) | +j | 0 | 0 |
| NAA (state #3) | 0 | −1 | 0 |
| ANN (state #4) | −j | 0 | 0 |
| ANA (state #5) | 0 | +1 | 0 |
| AAN (state #6) | −1 | 0 | 0 |
| AAA (state #7) | 0 | +j | 0 |
| DDN (state #8) | 0 | 0 | +1 |

In Table 9, in case of MIMO PCC+non-MIMO SCC, HARQ-ACKs(0) and (1) may denote HARQ ACK(A)/NACK(N)/DTX(D) results with respect to a PDSCH on the PCC (or SPS release PDCCH on the PCC) and HARQ-ACK(2) may denote a HARQ ACK(A)/NACK(N)/DTX(D) result with respect to a PDSCH on the SCC. N represents NACK or DTX. MIMO PUCCHs #1 and #2 may indicate PUCCH resources (indexes) linked to a lowest CCE $n_{CCE}$ and the following CCE index $n_{CCE}$+1 corresponding to a PCC PDCCH. Non-MIMO PUCCH #1 may indicate a PUCCH resource (index) linked to a CCE constituting an SCC PDCCH (in case of cross-carrier scheduling) or a PUCCH resource (index) indicated/allocated using an ARI (in case of non-cross-carrier scheduling).

In Table 9, in case of non-MIMO PCC+MIMO SCC, HARQ-ACKs(0) and (1) may denote HARQ ACK(A)/NACK(N)/DTX(D) results with respect to a PDSCH on the SCC and HARQ-ACK(2) may denote a HARQ ACK(A)/NACK(N)/DTX(D) result with respect to a PDSCH on the PCC (or SPS release PDCCH on the PCC). N represents NACK or DTX. MIMO PUCCHs #1 and #2 may indicate PUCCH resources (indexes) linked to a lowest CCE $n_{CCE}$ and the following CCE index $n_{CCE}$+1 corresponding to an SCC PDCCH (in case of cross-carrier scheduling) or PUCCH resources (indexes) indicated/allocated using an ARI (in case of non-cross-carrier scheduling). Non-MIMO PUCCH #1 may indicate a PUCCH resource (index) linked to a lowest CCE $n_{CCE}$ corresponding to a PCC PDCCH.

An ACK/NACK mapping table of Table 10 can be considered as a modification of the mapping scheme of FIG. 17. The mapping scheme of Table 10 supports fallback in the DL PCC. In the following, NNN may be decoupled from DTX or coupled with DTX. That is, NNN can be DDN or NND according to implementation.

TABLE 10

| HARQ-ACK(0), HARQ-ACK(1), HARQ-ACK(2) | MIMO PUCCH #1 | MIMO PUCCH #2 | Non-MIMO PUCCH #1 |
|---|---|---|---|
| NNN | +1 (If PCC is MIMO mode) | 0 | +1 (If PCC is non-MIMO) |
| NNA | 0 | 0 | −1 |
| NAN | −j | 0 | 0 |
| NAA | 0 | −j | 0 |
| ANN | +j | 0 | 0 |
| ANA | 0 | +j | 0 |
| AAN | −1 | 0 | 0 |
| AAA | 0 | −1 | 0 |

As described above with reference to FIGS. 17 and 18, in options 2, 3 and 4, each ACK/NACK state can be mapped to a QPSK symbol on a corresponding PUCCH resource in consideration of schemes of maximizing gray coding and Euclidean distance.

In the above-mentioned ACK/NACK mapping schemes, ACK/NACK performance may be different according to ACK/NACK bits. This is because different numbers (types) of resources may be used for ACK/NACK bits to select ACK/NACK and QPSK constellation utilization format may be different for ACK/NACK bits. To solve unequal ACK/NACK performance, a scheme of changing the position of each ACK/NACK in an ACK/NACK state according to a predetermined rule can be considered. It is possible to equalize performances of ACK/NACK bits by changing positions of ACK/NACKs in an ACK/NACK state.

Specifically, the position of each ACK/NACK can be changed with time in an ACK/NACK state. For example, when an SCC is set to MIMO, ACK/NACK for the first TB of the SCC can be located at the first ACK/NACK position (i.e. MSB) and ACK/NACK for the second TB can be allocated to the second ACK/NACK position at a time. The ACK/NACK for the first TB of the SCC can be allocated to the second ACK/NACK position and the ACK/NACK for the second TB can be allocated to the first ACK/NACK position at a different time. In this manner, positions of individual ACK/NACKs can be changed in an ACK/NACK state to equalize ACK/NACK performance for the 2 TBs of the SCC in the time domain.

Positions of individual ACK/NACKs in an ACK/NACK state may be changed on a subframe basis. For example, the ACK/NACK for the first TB of the SCC can be allocated to the first ACK/NACK position and the ACK/NACK for the second TB can be allocated to the second ACK/NACK position in an even-numbered subframe, whereas the ACK/NACK for the first TB of the SCC can be allocated to the second ACK/NACK position and the ACK/NACK for the second TB can be allocated to the first ACK/NACK position in an odd-numbered subframe, or vice versa.

Furthermore, positions of individual ACK/NACKs in an ACK/NACK state may be changed on a slot basis while being maintained for subframes. For example, the ACK/NACK for the first TB of the SCC can be allocated to the first ACK/NACK position and the ACK/NACK for the second TB can be allocated to the second ACK/NACK position in an even-numbered slot, whereas the ACK/NACK for the first TB of the SCC can be allocated to the second ACK/NACK position and the ACK/NACK for the second TB can be allocated to the first ACK/NACK position in an odd-numbered slot, or vice versa.

The above-described ACK/NACK performance equalization scheme exemplifies a case in which only the order of ACK/NACKs corresponding to the TBs of the SCC is changed in consideration of PCC fallback. However, if PCC fallback is not considered, ACK/NACK performance can be equalized in various manners. For example, the above-described ACK/NACK performance equalization scheme can be equally applied to a case in which the PCC is set to the MIMO mode. Alternatively, ACK/NACKs corresponding to TBs of the PCC and SCC may be mixed in an ACK/NACK state without discriminating the PCC and SCC from each other.

4-Bit ACK/NACK Mapping

Figure 19:
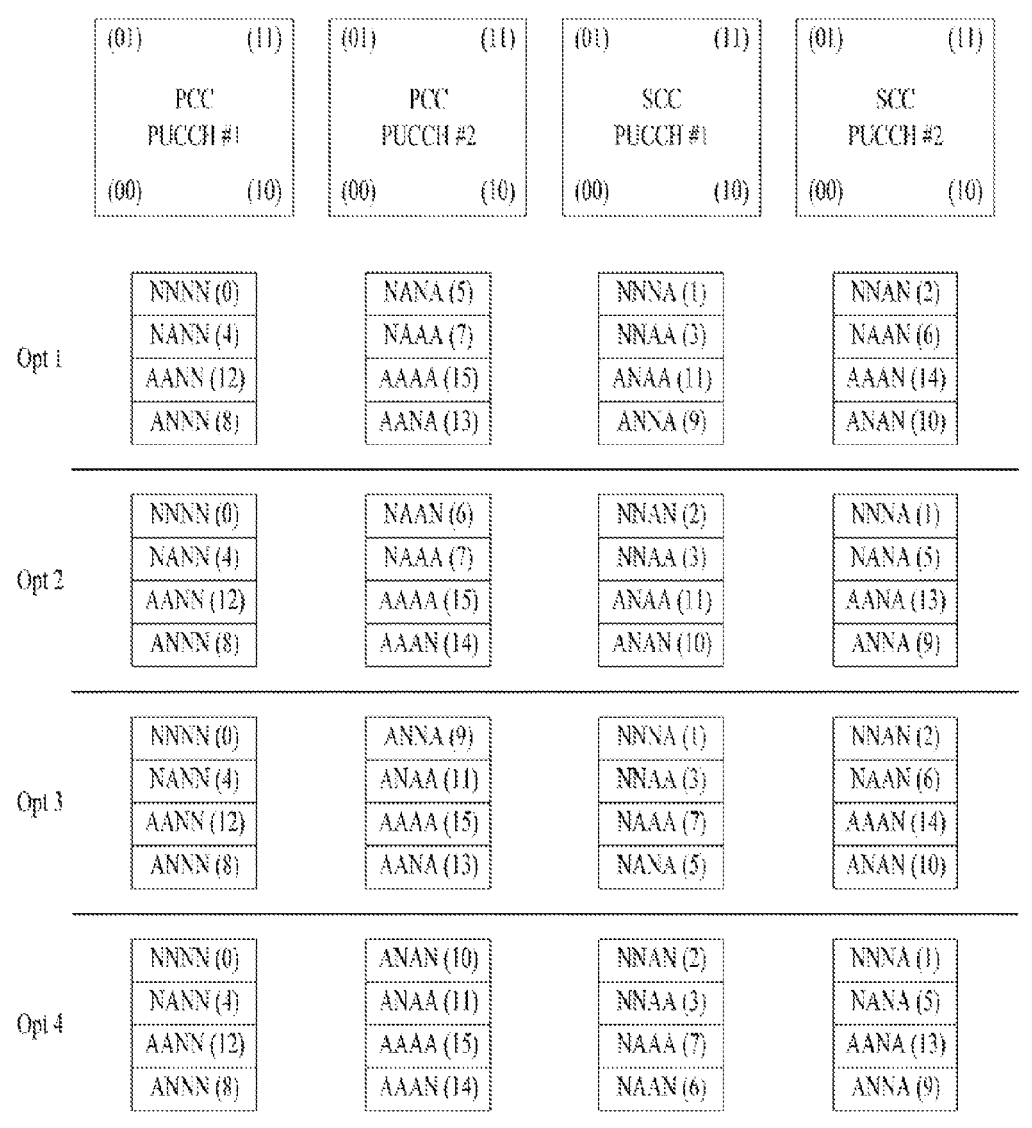

FIGS. 19 and 20 illustrate a 4-bit ACK/NACK mapping method according to an embodiment of the present invention. This method corresponds to a case in which both the DL PCC and DL SCC correspond to the MIMO mode. 4 PUCCH resources are used for ACK/NACK channel selection. Resources linked to a PCC PDCCH are PCC PUCCHs #1 and #2 and resources linked to an SCC PDCCH are SCC PUCCHs #1 and #2. In this case, 2-bit ACK/NACK information regarding a TB of the MIMO DL PCC can be allocated to 2 MSBs of the entire ACK/NACK information and 2-bit ACK/NACK information regarding a TB of the MIMO DL SCC can be allocated to 2 LSBs of the entire ACK/NACK information. The entire ACK/NACK information corresponds to an ACK/NACK state (i.e. a plurality of ACK/NACKs).

Referring to FIGS. 19 and 20, mapping schemes are identical to those in the single CW fallback case (e.g. FIGS. 15 and 16) except in the case of PCC PUCCH #1. That is, options of the mapping schemes according to the present embodiment are similar to those of the single CW fallback case except that PCC PUCCH #1 needs to be mapped as in PUCCH format 1B to support 2-CW fallback. To support 2-CW fallback, PCC PUCCH #1 mapping needs to correspond to PUCCH format 1b mapping, and thus states #0, #4, #12 and #8 are respectively mapped to QPSK constellation points (00), (01), (11) and (10) on PCC PUCCH #1.

For mapping satisfying all the design bases 1 to 4, options 1 to 4 of FIG. 19 can be considered.

For optimization of ACK/NACK response performance, mapping of ACK/NACK states to PUCCH resources can be configured such that a Hamming distance between neighboring states in the QPSK constellation is minimized (e.g. gray coding is used) and a Euclidian distance between ACK/NACK states in the constellation is maximized. FIG. 20 illustrates an example of mapping option 1 to PUCCH resources.

Referring to FIG. 20, to support 2-CW fallback, states #0, #4, #12 and #8 are respectively mapped to QPSK constellation points (00), (01), (11) and (10). Gray coding cannot be satisfied in PCC PUCCH #1 due to restrictions on fallback. However, the remaining resources (PCC PUCCH #2 and SCC PUCCHs #1 and #2) can be mapped using 4 available states such that gray coding and Euclidean distance are maximized for optimization of ACK/NACK response performance, as shown in FIG. 20.

Table 11 shows an ACK/NACK mapping table according to FIG. 20.

TABLE 11

| HARQ-ACK(0), HARQ-ACK(1), HARQ-ACK(2), HARQ-ACK(3) | PCC PUCCH #1 | PCC PUCCH #2 | SCC PUCCH #1 | SCC PUCCH #2 |
|---|---|---|---|---|
| NNNN (state #0)  | +1 | 0  | 0  | 0  |
| NNNA (state #1)  | 0  | 0  | +1 | 0  |
| NNAN (state #2)  | 0  | 0  | 0  | +1 |
| NNAA (state #3)  | 0  | 0  | +j | 0  |
| NANN (state #4)  | +j | 0  | 0  | 0  |
| NANA (state #5)  | 0  | +1 | 0  | 0  |
| NAAN (state #6)  | 0  | 0  | 0  | +j |
| NAAA (state #7)  | 0  | +j | 0  | 0  |
| ANNN (state #8)  | −j | 0  | 0  | 0  |
| ANNA (state #9)  | 0  | 0  | −j | 0  |
| ANAN (state #10) | 0  | 0  | 0  | −j |
| ANAA (state #11) | 0  | 0  | −1 | 0  |
| AANN (state #12) | −1 | 0  | 0  | 0  |
| AANA (state #13) | 0  | −j | 0  | 0  |
| AAAN (state #14) | 0  | 0  | 0  | −1 |
| AAAA (state #15) | 0  | −1 | 0  | 0  |

In Table 11, HARQ-ACKs(0) and (1) denote HARQ ACK (A)/NACK(N)/DTX(D) results with respect to a PDSCH on the PCC (or SPS release PDCCH on the PCC) and HARQ-ACKs(2) and (3) denote HARQ ACK(A)/NACK(N)/DTX (D) results with respect to a PDSCH on the SCC. N represents NACK or DTX. PCC PUCCHs #1 and #2 may indicate PUCCH resources (indexes) linked to a lowest CCE $n_{CCE}$ and the following CCE index $n_{CCE}+1$ corresponding to the PCC PDCCH. SCC PUCCHs #1 and #2 may indicate PUCCH resources (indexes) linked to a lowest CCE $n_{CCE}$ and the following CCE index $n_{CCE}+1$ corresponding to the SCC PDCCH (in case of cross-carrier scheduling) or PUCCH resources (indexes) indicated/allocated using an ARI (in case of non-cross-carrier scheduling).

In case of option 1, various applications for maximizing gray coding and a Euclidian distance between ACK/NACK states (e.g. constellation rotation) are available. Furthermore, various schemes for maximizing gray coding and a Euclidian distance between ACK/NACK states, as described above, can be considered in case of options 2, 3 and 4. In addition, a mapping scheme of changing bundles of 4 states, which are respectively mapped to SCC PUCCH #1 and SCC PUCCH #2, can be considered for all options. For example, in case of option 1, states #2, #6, #14 and #10 can be allocated to SCC PUCCH #1 and states #1, #2, #11 and #9 can be allocated to SCC PUCCH #2.

In the above-mentioned ACK/NACK mapping schemes, ACK/NACK performance may be different for ACK/NACK bits. This is because different numbers (types) of resources may be used for ACK/NACK bits to select ACK/NACK and QPSK constellation utilization format may be different for ACK/NACK bits. To solve unequal ACK/NACK performance, a scheme of changing the position of each ACK/NACK in an ACK/NACK state according to a predetermined rule can be considered. It is possible to equalize performances of ACK/NACK bits by changing positions of ACK/NACKs in an ACK/NACK state.

Specifically, the position of each ACK/NACK can be changed with time in an ACK/NACK state. For example, when the SCC is set to MIMO, ACK/NACK for the first TB of the SCC can be located at the third ACK/NACK position and ACK/NACK for the second TB can be allocated to the fourth ACK/NACK position (i.e. LSB) at a time. The ACK/NACK for the first TB of the SCC can be located at the fourth ACK/NACK position and the ACK/NACK for the second TB can be allocated to the third ACK/NACK position at a different time. In this manner, positions of individual ACK/NACKs can be changed in an ACK/NACK state to equalize ACK/NACK performance for the 2 TBs of the SCC in the time domain.

Positions of individual ACK/NACKs in an ACK/NACK state may be changed on a subframe basis. For example, the ACK/NACK for the first TB of the SCC can be allocated to the third ACK/NACK position and the ACK/NACK for the second TB can be allocated to the fourth ACK/NACK position in an even-numbered subframe, whereas the ACK/NACK for the first TB of the SCC can be allocated to the fourth ACK/NACK position and the ACK/NACK for the second TB can be allocated to the third ACK/NACK position in an odd-numbered subframe, or vice versa.

Furthermore, positions of individual ACK/NACKs in an ACK/NACK state may be changed on a slot basis while being maintained for subframes. For example, the ACK/NACK for the first TB of the SCC can be allocated to the third ACK/NACK position and the ACK/NACK for the second TB can be allocated to the fourth ACK/NACK position in an even-numbered slot, whereas the ACK/NACK for the first TB of the SCC can be allocated to the fourth ACK/NACK position and the ACK/NACK for the second TB can be allocated to the third ACK/NACK position in an odd-numbered slot, or vice versa.

The above-described ACK/NACK performance equalization scheme exemplifies a case in which only the order of ACK/NACKs corresponding to the TBs of the SCC is changed in consideration of PCC fallback. However, even if PCC fallback is applied, it is possible to change the order of ACK/NACK for the second TB of the PCC and ACK/NACKs for the TBs of the SCC in an ACK/NACK state.

If PCC fallback is not considered, it is possible to equalize ACK/NACK performance in a wider variety of manners. For example, the above-described ACK/NACK performance equalization scheme can be equally applied to a case in which the PCC is set to the MIMO mode. Furthermore, positions of ACK/NACKs corresponding to TBs of the PCC and SCC can be changed without restriction in an ACK/NACK state.

Embodiment 3

NACK/DTX Decoupling for 2-Bit and 3-Bit Channel Selection Mapping

In the above-described channel selection mapping schemes, NACK and DTX are represented as NACK without being discriminated from each other. For example, in 2-bit ACK/NACK selection mapping, NN (state #0) indicates states of Table 12. Since DTX/DTX is not transmitted, it is excluded from Table 12.

TABLE 12

| Case | PCC | SCC |
| --- | --- | --- |
| 1 | DTX | NACK |
| 2 | NACK | DTX |
| 3 | NACK | NACK |

However, when the UE supports single CW fallback, states that can be transmitted using NN (state #0) are limited to cases 2 and 3 of Table 12. That is, the UE cannot transmit a state having DTX for the PCC and NACK for the SCC. A description will be given of a mapping scheme for additionally transmitting a state that cannot be transmitted using NACK/DTX decoupling.

Referring to ACK/NACK mapping of embodiments 1 and 2, in case of 4-bit mapping, NACK/DTX decoupling cannot be performed because the total number of states that need to be transmitted are 16 even when NACK and DTX are coupled and the number of states available for all resources is 16. However, in case of 2-bit and 3-bit mapping, a remaining (i.e. available) state is present. Accordingly, the present embodiment proposes a scheme of transmitting a decoupled PCC DTX state using a remaining state. In addition, the present embodiment proposes a scheme of transmitting a state having DTX for the PCC and ACK for the SCC using a remaining state.

2-Bit ACK/NACK Mapping

In case of 2-bit mapping, mapping for single-CW fallback (embodiment 1) is identical to mapping for 2-CW fallback (embodiment 2). Accordingly, the same decoupled PCC DTX state transmission scheme can be considered for single CW fallback and 2-CW fallback.

Figure 21:
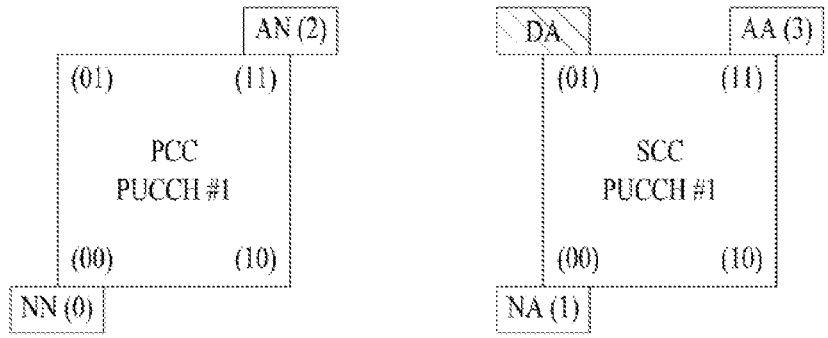
Figure 22:
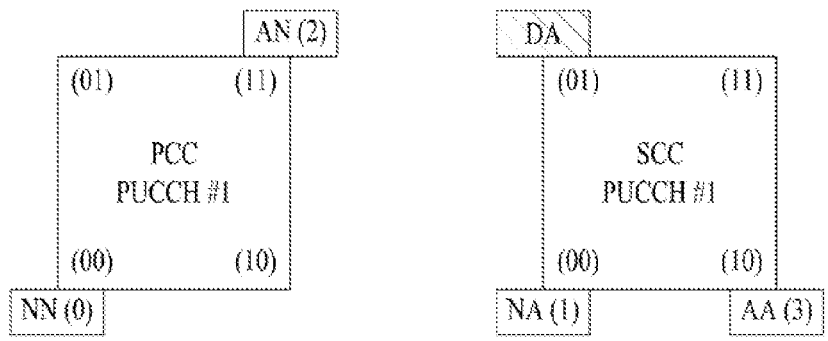
Figure 23:
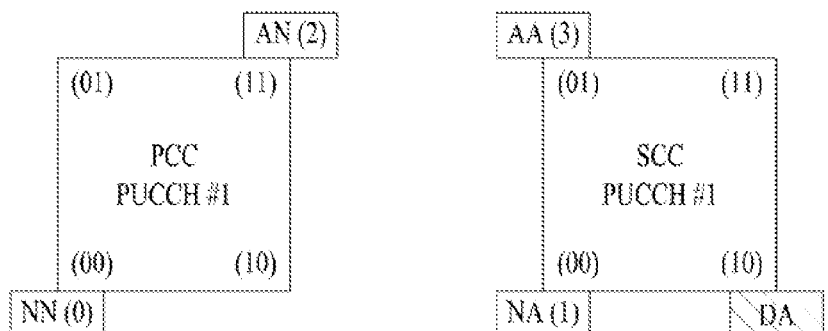

FIGS. 21, 22 and 23 illustrate 2-bit ACK/NACK mapping according to an embodiment of the present invention. In the present embodiment, DN (i.e. PCC DTX, SCC NACK) is additionally mapped to QPSK constellation point (01) or (10) of SCC PUCCH #1, which is not used in the mapping scheme of FIG. 11.

Referring to FIG. 21, DN is mapped to QPSK constellation point (01) of SCC PUCCH #1. FIGS. 22 and 23 illustrate modifications of FIG. 21. In case of FIGS. 22 and 23, gray coding is applied to SCC PUCCH #1. A scheme of additionally mapping DA instead of DN to a constellation point of SCC PUCCH #1 may also be considered. When DA instead of DN is added, it is possible to minimize a Hamming distance between neighboring states (e.g. AA or NA) in a physical channel.

Table 13 is an ACK/NACK mapping table according to FIG. 21.

TABLE 13

| HARQ-ACK(0), HARQ-ACK(1) | Ch1 (PCC PUCCH #1) | Ch2 (SCC PUCCH #1) |
|---|---|---|
| NN | +1 | 0 |
| NA | 0 | +1 |
| AN | −1 | 0 |
| AA | 0 | −1 |
| DN | 0 | +j |

3-Bit ACK/NACK Mapping

In case of embodiment 2, the mapping scheme using DDN decoupling is inevitably considered in order to support 2-CW fallback. Accordingly, the present embodiment considers a scheme of mapping states having DTX for the PCC and NACK for all SCCs (i.e. DDN when the PCC is set to MIMO and DNN when the PCC is set to non-MIMO) to the same or different constellation points of an SCC PUCCH resource, which are not used.

Figure 24:
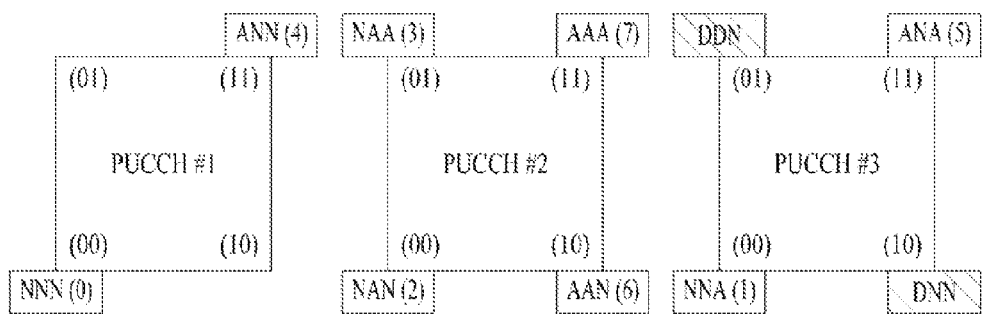
Figure 25:
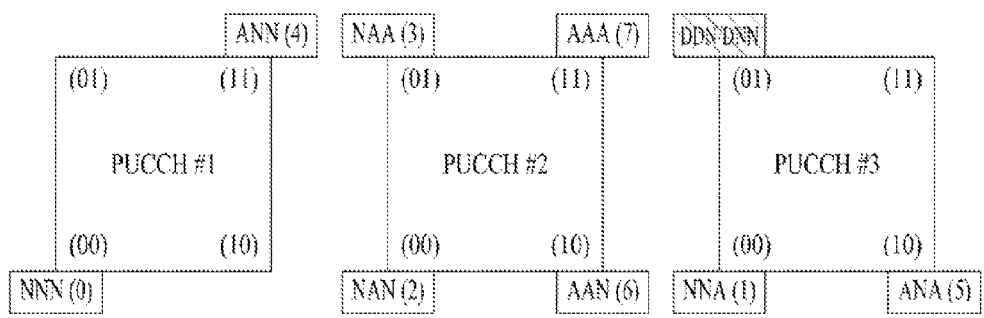
Figure 26:
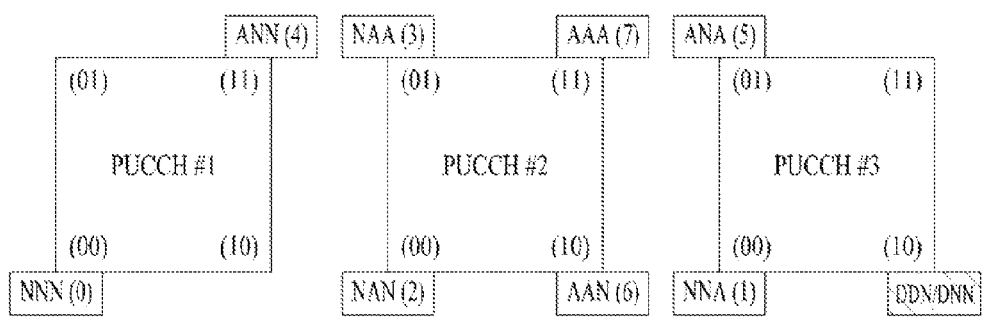

FIGS. 24, 25 and 26 illustrate 3-bit ACK/NACK mapping according to embodiments of the present invention. FIG. 24 shows a case in which DDN and DNN are respectively mapped to QPSK constellation points (01) and (10) in an SCC PUCCH resource (i.e. PUCCH #3). FIG. 25 shows a case in which both DDN and DNN are mapped to QPSK constellation point (01) in the SCC PUCCH resource (i.e. PUCCH #3). FIG. 26 shows a case in which both DDN and DNN are mapped to QPSK constellation points (10) and (10) in the SCC PUCCH resource (i.e. PUCCH #3). Gray coding is applied to the SCC PUCCH resource (i.e. PUCCH #3) in case of FIGS. 25 and 26.

In mapping according to the present embodiments, DNN is not present when the PCC is set to MIMO and DDN is not present when the PCC is set to non-MIMO.

DAA/DDA instead of DDN/DNN may be additionally mapped to a constellation point of the SCC PUCCH resource (i.e. PUCCH #3). That is, DAA/DDA can be added instead of DDN/DNN.

Table 14 is an ACK/NACK mapping table according to the mapping scheme of FIG. 24.

TABLE 14

| HARQ-ACK(0), HARQ-ACK(1), HARQ-ACK(2) | PUCCH #1 | PUCCH #2 | PUCCH #3 |
|---|---|---|---|
| NNN (state #0) | +1 | | |
| NNA (state #1) | | | +1 |
| NAN (state #2) | | +1 | |
| NAA (state #3) | | +j | |
| ANN (state #4) | −1 | | |
| ANA (state #5) | | | −1 |
| AAN (state #6) | | −j | |
| AAA (state#7) | | −1 | |
| DDN | | | +j |
| DNN | | | −j |

Alternatively, a 2-bit ACK/NACK mapping table considering DTX is as follows. In Table 15, N denotes NACK and ND denotes NACK or DTX.

TABLE 15

| HARQ-ACK(0), HARQ-ACK(1) | PUCCH #1 | PUCCH #2 |
|---|---|---|
| N/ND | +1 | 0 |
| ND/A | 0 | +1 |
| A/ND | −1 | 0 |

TABLE 15-continued

| HARQ-ACK(0), HARQ-ACK(1) | PUCCH #1 | PUCCH #2 |
|---|---|---|
| A/A | 0 | +j |
| D/N | 0 | −j |
| D/D | 0 | 0 |

A 3-bit ACK/NACK mapping table considering DTX is as follows. In Table 16, N denotes NACK and ND denotes NACK or DTX.

TABLE 16

| HARQ-ACK(0), HARQ-ACK(1), HARQ-ACK(2) | PUCCH #1 | PUCCH #2 | PUCCH #3 |
|---|---|---|---|
| N/ND/ND | +1 | 0 | 0 |
| ND/ND/A | 0 | 0 | −1 |
| N/A/ND | 0 | +1 | 0 |
| ND/A/A | 0 | −j | 0 |
| A/ND/ND | −1 | 0 | 0 |
| A/N/A | 0 | 0 | −j |
| A/A/ND | 0 | +j | 0 |
| A/A/A | 0 | −1 | 0 |
| D/D/N | 0 | 0 | +j |
| D/N/N | 0 | 0 | +1 |
| D/D/D | 0 | 0 | 0 |

Figure 27:
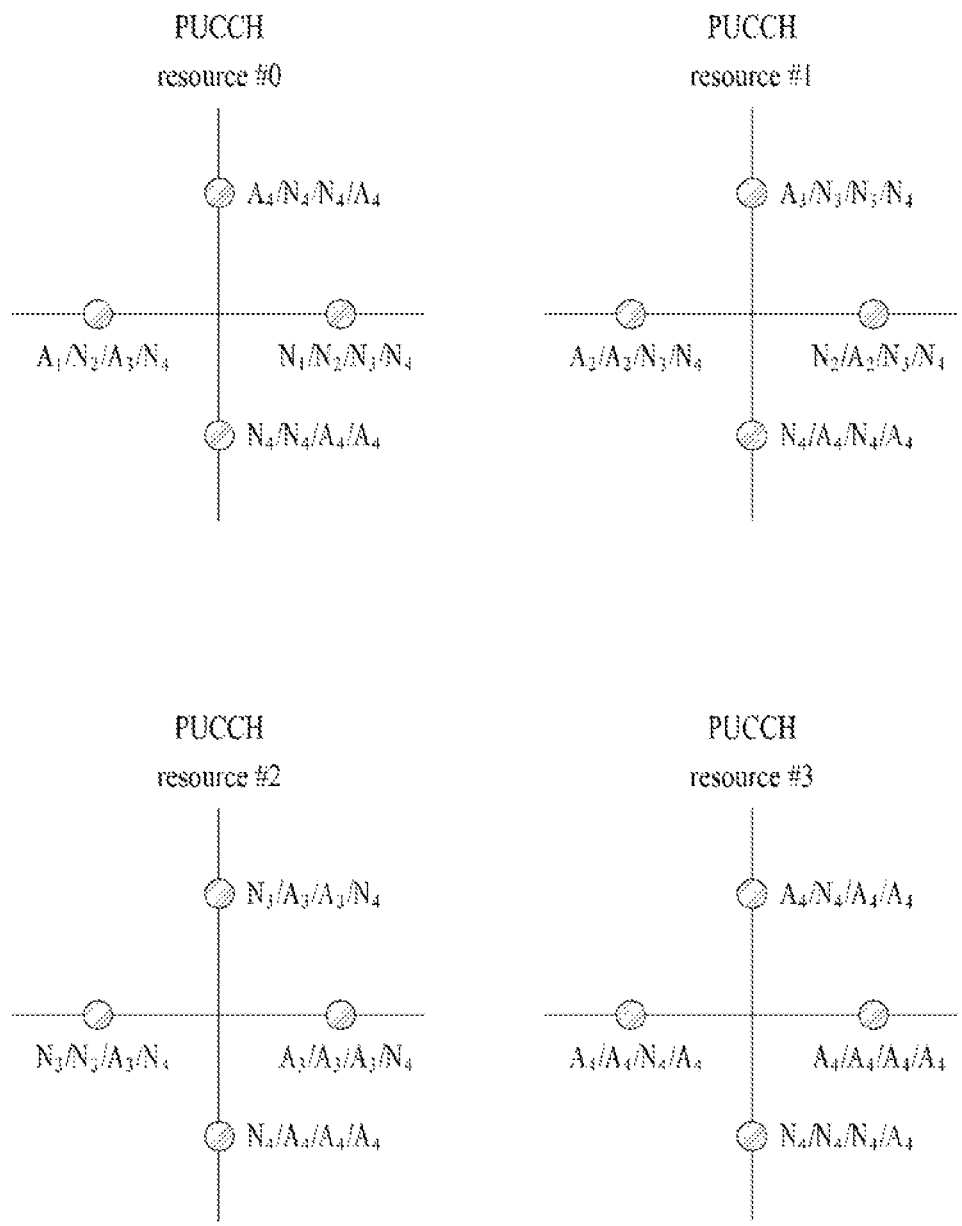
Figure 28:
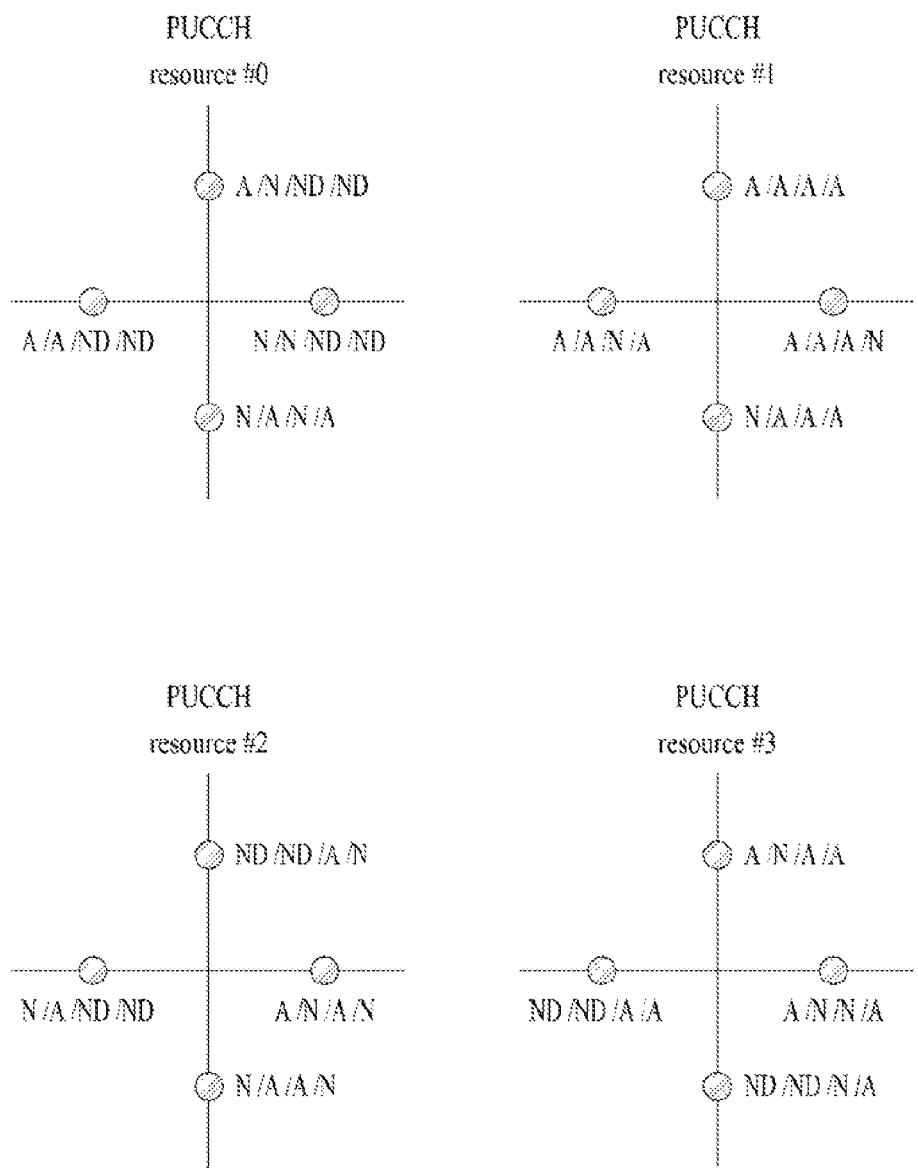
Figure 29:
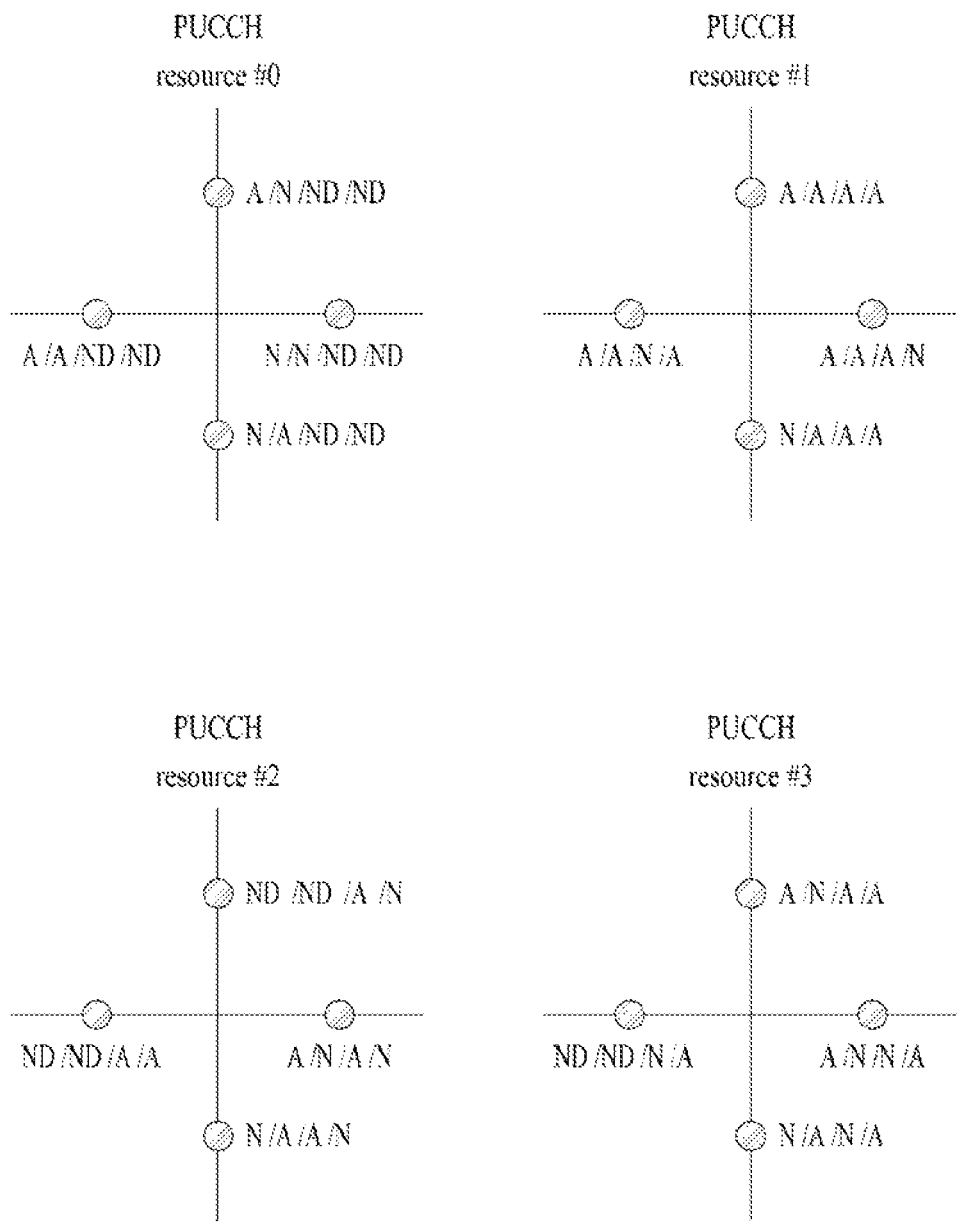

FIGS. 27, 28 and 29 illustrate 4-bit ACK/NACK mapping considering DTX. Mapping schemes shown in FIGS. 27, 28 and 29 can be used as a single mapping method for 1-bit to 4-bit ACK/NACK mapping. For example, in the mapping scheme of FIG. 27, $A_1$ or $N_1$ is transmitted in the first PUCCH resource in case of 1-bit ACK/NACK, and $A_1/N_2$ or $N_1/N_2$ is transmitted in the first PUCCH resource or $A_2/A_2$ or $N_2/A_2$ is transmitted in the second PUCCH resource in case of 2-bit ACK/NACK. In case of 3-bit ACK/NACK, $A_1/N_2/A_3$ or $N_1/N_2/N_3$ is transmitted in the first PUCCH resource, $A_2/A_2/N_3$ or $N_2/A_2/N_3$ is transmitted in the second PUCCH resource, or $N_3/N_3/A_3$ or $A_3/A_3/A_3$ is transmitted in the third PUCCH resource. In case of 4-bit ACK/NACK, each ACK/NACK state is transmitted through a QPSK constellation point selected from 4 PUCCH resources, as shown in FIG. 27. In case of mapping schemes of FIGS. 28 and 29, 1-bit to 4-bit ACK/NACK can be configured through a single mapping method as described with reference to FIG. 27.

Figure 30:
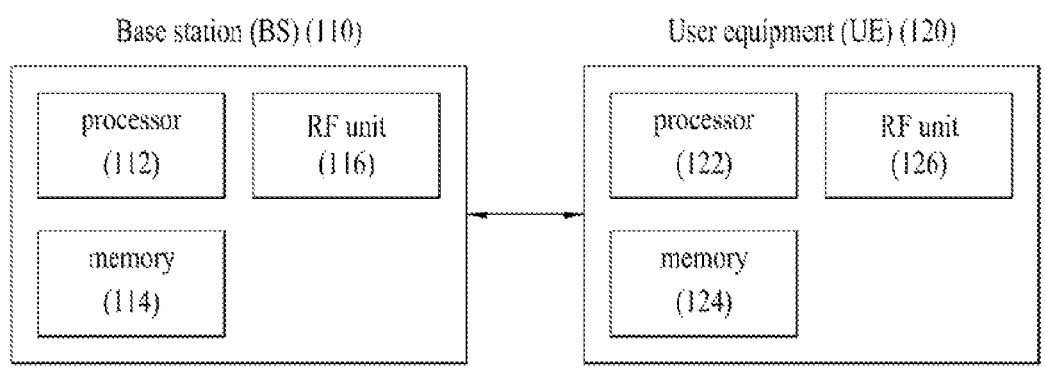
FIG. 30 illustrates a base station (BS) and a UE applicable to an embodiment of the present invention.

FIG. 30 illustrates a BS and a UE applicable to an embodiment of the present invention. When a wireless communication system includes a relay, communication is performed between a BS and the relay on a backhaul link and between the relay and a UE on an access link. The BS or UE shown in FIG. 16 can be replaced by a relay as necessary.

Referring to FIG. 30, an RF communication system includes a BS 110 and a UE 120. The BS 110 includes a processor 112, a memory 114 and an RF unit 116. The processor 112 may be configured to implement the procedures and/or methods proposed by the present invention. The memory 114 is connected to the processor 112 and stores various types of information relating to operations of the processor 112. The RF unit 116 is connected to the processor 112 and transmits and/or receives RF signals. The UE 120 includes a processor 122, a memory 124 and an RF unit 126. The processor 122 may be configured to implement the procedures and/or methods proposed by the present invention. The memory 124 is connected to the processor 122 and stores various types of information relating to operations of the processor 122. The RF unit 126 is connected to the processor 122 and transmits and/or receives RF signals. The BS 110 and the UE 120 may have a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made, centering on a data transmission and reception relationship between a BS and a UE. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to wireless communication apparatuses such as a UE, a relay, a BS, etc.

The invention claimed is:

1. A method for transmitting uplink control information when a plurality of cells including a primary cell and a secondary cell is configured in a wireless communication system, the method comprising:

selecting a PUCCH (Physical Uplink Control Channel) resource corresponding to a plurality of HARQ ACKs (Hybrid Automatic Repeat request-Acknowledgements) from a plurality of PUCCH resources for PUCCH format 1b; and transmitting a complex value corresponding to the plurality of HARQ-ACKs using the selected PUCCH resource, wherein the plurality of HARQ-ACKs, PUCCH resources and bit values have the relationship represented by the following table,

| HARQ-ACK(0), HARQ-ACK(1), HARQ-ACK(2) | PUCCH resource #1 | PUCCH resource #2 | PUCCH resource #3 |
| --- | --- | --- | --- |
| N, N, N | +1 | 0 | 0 |
| N, N, A | 0 | 0 | −1 |
| N, A, N | +j | 0 | 0 |
| N, A, A | 0 | −1 | 0 |
| A, N, N | −j | 0 | 0 |
| A, N, A | 0 | +1 | 0 |
| A, A, N | −1 | 0 | 0 |
| A, A, A | 0 | +j | 0 |
| D, D, N | 0 | 0 | +1 | wherein HARQ-ACKs(0) and (1) indicate ACK(A)/NACK(N)/DTX(D) responses to data block(s) on a MIMO (Multiple Input Multiple Output) cell, HARQ-ACK(2) indicates an ACK(A)/NACK(N)/DTX(D) response to a data block on a non-MIMO cell, PUCCH resources #1 and #2 represent PUCCH resources linked to the MIMO cell for PUCCH format 1b, and PUCCH resource #3 represents a PUCCH resource linked to the non-MIMO cell for PUCCH format 1b.

2. The method according to claim 1, wherein, when the primary cell and the secondary cell are respectively configured as the MIMO cell and the non-MIMO cell, HARQ-ACKs(0) and (1) denote ACK/NACK/DTX responses to a PDSCH (Physical Downlink Control Channel) on the primary cell and HARQ-ACK(2) denotes an ACK/NACK/DTX response to a PDSCH on the secondary cell.

3. The method according to claim 2, wherein the PUCCH resource #1 represents a PUCCH resource linked to a first CCE (Control Channel Element) constituting a PDCCH (Physical Downlink Control Channel) corresponding to the PDSCH on the primary cell, and PUCCH resource #2 represents a PUCCH resource linked to a second CCE constituting the PDCCH corresponding to the PDSCH on the primary cell.

4. The method according to claim 1, wherein, when the primary cell and the secondary cell are respectively configured as the non-MIMO cell and the MIMO cell, HARQ-ACKs(0) and (1) denote ACK/NACK/DTX responses to a PDSCH on the secondary cell and HARQ-ACK(2) denotes an ACK/NACK/DTX response to a PDSCH on the primary cell.

5. The method according to claim 4, wherein the PUCCH resource #3 represents a PUCCH resource linked to a first CCE constituting a PDCCH corresponding to the PDSCH on the primary cell.

6. The method according to claim 1, wherein the primary cell includes a PCC (Primary Component Carrier) and the secondary cell includes an SCC (Secondary Component Carrier).

7. A communication apparatus configured to transmit uplink control information when a plurality of cells including a primary cell and a secondary cell is configured in a wireless communication system, the communication apparatus comprising:

an RF unit; and a processor, wherein the processor is configured to select a PUCCH resource corresponding to a plurality of HARQ ACKs from a plurality of PUCCH resources for PUCCH format 1b and to transmit a complex value corresponding to the plurality of HARQ-ACKs using the selected PUCCH resource, wherein the plurality of HARQ-ACKs, PUCCH resources and bit values have the relationship represented by the following table,

| HARQ-ACK(0), HARQ-ACK(1), HARQ-ACK(2) | PUCCH resource #1 | PUCCH resource #2 | PUCCH resource #3 |
|---|---|---|---|
| N, N, N | +1 | 0 | 0 |
| N, N, A | 0 | 0 | −1 |
| N, A, N | +j | 0 | 0 |
| N, A, A | 0 | −1 | 0 |
| A, N, N | −j | 0 | 0 |
| A, N, A | 0 | +1 | 0 |
| A, A, N | −1 | 0 | 0 |
| A, A, A | 0 | +j | 0 |
| D, D, N | 0 | 0 | +1 | wherein HARQ-ACKs(0) and (1) indicate ACK(A)/NACK(N)/DTX(D) responses to data block(s) on a MIMO (Multiple Input Multiple Output) cell, HARQ-ACK(2) indicates an ACK(A)/NACK(N)/DTX(D) response to a data block on a non-MIMO cell, PUCCH resources #1 and #2 represent PUCCH resources linked to the MIMO cell for PUCCH format 1b, and PUCCH resource #3 represents a PUCCH resource linked to the non-MIMO cell for PUCCH format 1b.

8. The communication apparatus according to claim 7, wherein, when the primary cell and the secondary cell are respectively configured as the MIMO cell and the non-MIMO cell, HARQ-ACKs(0) and (1) denote ACK/NACK/DTX responses to a PDSCH (Physical Downlink Control Channel) on the primary cell and HARQ-ACK(2) denotes an ACK/NACK/DTX response to a PDSCH on the secondary cell.

9. The communication apparatus according to claim 8, wherein the PUCCH resource #1 represents a PUCCH resource linked to a first CCE (Control Channel Element) constituting a PDCCH (Physical Downlink Control Channel) corresponding to the PDSCH on the primary cell, and PUCCH resource #2 represents a PUCCH resource linked to a second CCE constituting the PDCCH corresponding to the PDSCH on the primary cell.

10. The communication apparatus according to claim 7, wherein, when the primary cell and the secondary cell are respectively configured as the non-MIMO cell and the MIMO cell, HARQ-ACKs(0) and (1) denote ACK/NACK/DTX responses to a PDSCH on the secondary cell and HARQ-ACK(2) denotes an ACK/NACK/DTX response to a PDSCH on the primary cell.

11. The communication apparatus according to claim 10, wherein the PUCCH resource #3 represents a PUCCH resource linked to a first CCE constituting a PDCCH corresponding to the PDSCH on the primary cell.

12. The communication apparatus according to claim 7, wherein the primary cell includes a PCC (Primary Component Carrier) and the secondary cell includes an SCC (Secondary Component Carrier).

* * * * *